United States Patent
Woodrow et al.

(10) Patent No.: US 11,551,554 B2
(45) Date of Patent: Jan. 10, 2023

(54) SYSTEMS AND METHODS FOR COORDINATING MOVEMENT OF ASSETS WITHIN A TRANSFER HUB

(71) Applicant: UATC, LLC, San Francisco, CA (US)

(72) Inventors: Alden James Woodrow, Oakland, CA (US); Alan Hugh Wells, San Rafael, CA (US); Maxwell MacGavin Pike, San Francisco, CA (US)

(73) Assignee: UATC, LLC, Mountain View, CA (US)

( * ) Notice: Subject to any disclaimer, the term of this patent is extended or adjusted under 35 U.S.C. 154(b) by 947 days.

(21) Appl. No.: 16/018,523

(22) Filed: Jun. 26, 2018

(65) Prior Publication Data

US 2019/0332104 A1 Oct. 31, 2019

Related U.S. Application Data

(60) Provisional application No. 62/663,007, filed on Apr. 26, 2018, provisional application No. 62/663,009, (Continued)

(51) Int. Cl.
*G05D 1/00* (2006.01)
*G05D 1/02* (2020.01)
(Continued)

(52) U.S. Cl.
CPC .......... *G08G 1/202* (2013.01); *G05D 1/0027* (2013.01); *G05D 1/0088* (2013.01);
(Continued)

(58) Field of Classification Search
CPC .......... B65G 63/00; G05D 2201/0216; G05D 1/0027; G05D 1/0287; G05D 1/0291;
(Continued)

(56) References Cited

U.S. PATENT DOCUMENTS

| | | | | |
|---|---|---|---|---|
| 2014/0129074 A1* | 5/2014 | Boshears | ............... | A63G 31/00 701/25 |
| 2014/0278635 A1* | 9/2014 | Fulton | ................. | G06Q 10/083 705/7.14 |

(Continued)

FOREIGN PATENT DOCUMENTS

| | | | | |
|---|---|---|---|---|
| JP | 2001052285 | | 2/2001 | |
| JP | 2017182772 | | 10/2017 | |
| KR | 20180012434 A | * | 2/2018 | .......... G05D 1/0027 |

OTHER PUBLICATIONS

International Search Report and Written Opinion for PCT/US2019/029367, dated Jul. 30, 2019, 12 pages.

*Primary Examiner* — Russell Frejd
*Assistant Examiner* — Sara J Lewandroski
(74) *Attorney, Agent, or Firm* — Dority & Manning, P.A.

(57) ABSTRACT

In one example embodiment, a computer-implemented method for coordinating the movement of assets at transfer hubs includes determining one or more assets to move from a first location associated with a transfer hub. The method also includes assigning a jockey to move the one or more assets to a second location associated with the transfer hub based at least in part on an availability of the jockey. The method further includes directing the jockey to move the one or more assets from the first location to the second location.

32 Claims, 10 Drawing Sheets

Related U.S. Application Data filed on Apr. 26, 2018, provisional application No. 62/662,996, filed on Apr. 26, 2018.

(51) Int. Cl.
*G08G 1/127* (2006.01)
*G08G 1/00* (2006.01)
*H04W 4/029* (2018.01)
*G07C 5/00* (2006.01)

(52) U.S. Cl.
CPC ........... *G05D 1/0297* (2013.01); *G07C 5/008* (2013.01); *G08G 1/127* (2013.01); *H04W 4/029* (2018.02)

(58) Field of Classification Search
CPC .. G05D 1/0293; G05D 1/0295; G05D 1/0297; G06Q 10/0832; G08G 1/20; G08G 1/202; G08G 1/205; G08G 1/207; G08G 1/22; G08G 1/123; G08G 1/127; G07C 5/00; G07C 5/008; G07C 5/02; G07C 5/08
See application file for complete search history.

(56) References Cited

U.S. PATENT DOCUMENTS

| | | |
|---|---|---|
| 2015/0149381 A1 | 5/2015 | Wada et al. |
| 2016/0239789 A1* | 8/2016 | Hanks ................... G06Q 30/04 |
| 2016/0334797 A1* | 11/2016 | Ross ..................... G05D 1/0217 |
| 2017/0262790 A1* | 9/2017 | Khasis ................. G08G 1/0116 |
| 2018/0086348 A1* | 3/2018 | Khandelwal .......... H04W 4/023 |
| 2018/0211541 A1* | 7/2018 | Rakah ............. B60W 60/00253 |
| 2019/0041852 A1* | 2/2019 | Schubert .............. G05D 1/0044 |
| 2019/0066041 A1* | 2/2019 | Hance ................ G01C 21/3407 |
| 2019/0095859 A1* | 3/2019 | Pike .................... G06Q 10/0834 |
| 2019/0227570 A1* | 7/2019 | Miller .................. G07C 5/0825 |
| 2020/0272145 A1* | 8/2020 | Kinoshita ............ G05D 1/0027 |
| 2020/0272949 A1* | 8/2020 | Chen ..................... H04W 4/025 |

\* cited by examiner

600

| CARGO ROUTE FOR ASSET (A1) INCLUDING CARGO (C1) | | | | |
|---|---|---|---|---|
| START LOCATION | SCHEDULED DEPARTURE TIME | TRANSPORTATION ROUTE(S) | END LOCATION | SCHEDULED ARRIVAL TIME |
| 470 | T0 | 491 | 410 | T1 |
| 410 | T2 | 433 | 414 | T3 |
| 414 | T6 | 435, 437 | 418 | T7 |
| 418 | T8 | 439 | 420 | T9 |
| 420 | T10 | 492 | 480 | T11 |

| TRANSFER SCHEDULE FOR TRANSFER HUB 414 | | | | |
|---|---|---|---|---|
| SCHEDULED TIME | START LOCATION | ASSET(S) | END LOCATION | JOCKEY |
| T1 | 510 | A2 | 536 | J1 |
| T1 | 510 | A3 | 540 | J2 |
| T1 | 512 | A5 | 542 | J4 |
| T2 | 512 | A4 | 538 | J3 |
| T2 | 510 | A6 | 536 | J1 |
| T2 | 542 | A5 | 522 | J4 |
| T3 | 512 | A7, A8 | 542 | J4 |
| T3 | 510 | A1 | 530 | J5 |
| T4 | 542 | A8 | 544 | J4 |
| T4 | 540 | A3 | 520 | J2 |
| T4 | 538 | A4 | 522 | J3 |
| T5 | 544 | A8 | 522 | J4 |
| T6 | 536 | A2, A6 | 520 | J1 |
| T6 | 530 | A1 | 520 | J6 |

*FIG. 7*

SYSTEMS AND METHODS FOR COORDINATING MOVEMENT OF ASSETS WITHIN A TRANSFER HUB

PRIORITY CLAIM

The present application claims the benefit of priority of U.S. Provisional Patent Applications No. 62/662,996, 62/663,007, and 62/663,009 filed Apr. 26, 2018, entitled "Systems and Methods for Controlling Autonomous Vehicle," "Systems and Methods for Coordinating an Arrival of One or More Assets at a Location," and "Systems and Methods for Managing Space at a Location for Receiving Assets," respectively. The above-referenced patent applications are hereby incorporated by reference herein in their entirety for all purposes.

FIELD

The present disclosure relates generally to controlling or managing operations of autonomous vehicles when providing a vehicle-based service and, more particularly, to systems and methods for coordinating the movement of assets within a transfer hub when providing a vehicle-based service.

BACKGROUND

An autonomous vehicle is a vehicle that is capable of sensing its environment and navigating without human input. In particular, an autonomous vehicle can observe its surrounding environment using a variety of sensors and can attempt to comprehend the environment by performing various processing techniques on data collected by the sensors. Given knowledge of an environment proximate to the autonomous vehicle, the autonomous vehicle can identify an appropriate motion plan through such environment. One or more such autonomous vehicles can be used to provide a vehicle-based service in which an autonomous vehicle(s) can autonomously navigate through an environment between a starting location and an ending location of the provided service.

SUMMARY

Aspects and advantages of the present disclosure will be set forth in part in the following description, or may be learned from the description, or may be learned through practice of the embodiments.

One example aspect of the present disclosure is directed to a computer-implemented method for coordinating the movement of assets at transfer hubs. The method includes determining one or more assets to move from a first location associated with a transfer hub. The method includes assigning a jockey to move the one or more assets to a second location associated with the transfer hub based at least in part on an availability of the jockey. The method includes directing the jockey to move the one or more assets from the first location to the second location.

Another example aspect of the present disclosure is directed to a computing system for coordinating the movement of assets at transfer hubs. The computing system includes one or more processors and one or more tangible, non-transitory, computer readable media that collectively store instructions that when executed by the one or more processors cause the computing system to perform operations. The operations include determining one or more assets to move from a first location associated with a transfer hub. The operations include assigning a jockey to move the one or more assets to a second location associated with the transfer hub based at least in part on an availability of the jockey. The operations include directing the jockey to move the one or more assets from the first location to the second location.

Other example aspects of the present disclosure are directed to systems, methods, vehicles, apparatuses, tangible, non-transitory computer-readable media, and memory devices for coordinating the movement of assets at one or more transfer hubs.

These and other features, aspects, and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth below, which make reference to the appended figures, in which:

FIG. 6 depicts an example of a cargo route in a transportation network according to example embodiments of the present disclosure;

FIG. 7 depicts an example transfer schedule associated with a transfer hub according to example embodiments of the present disclosure;

Figure 1:
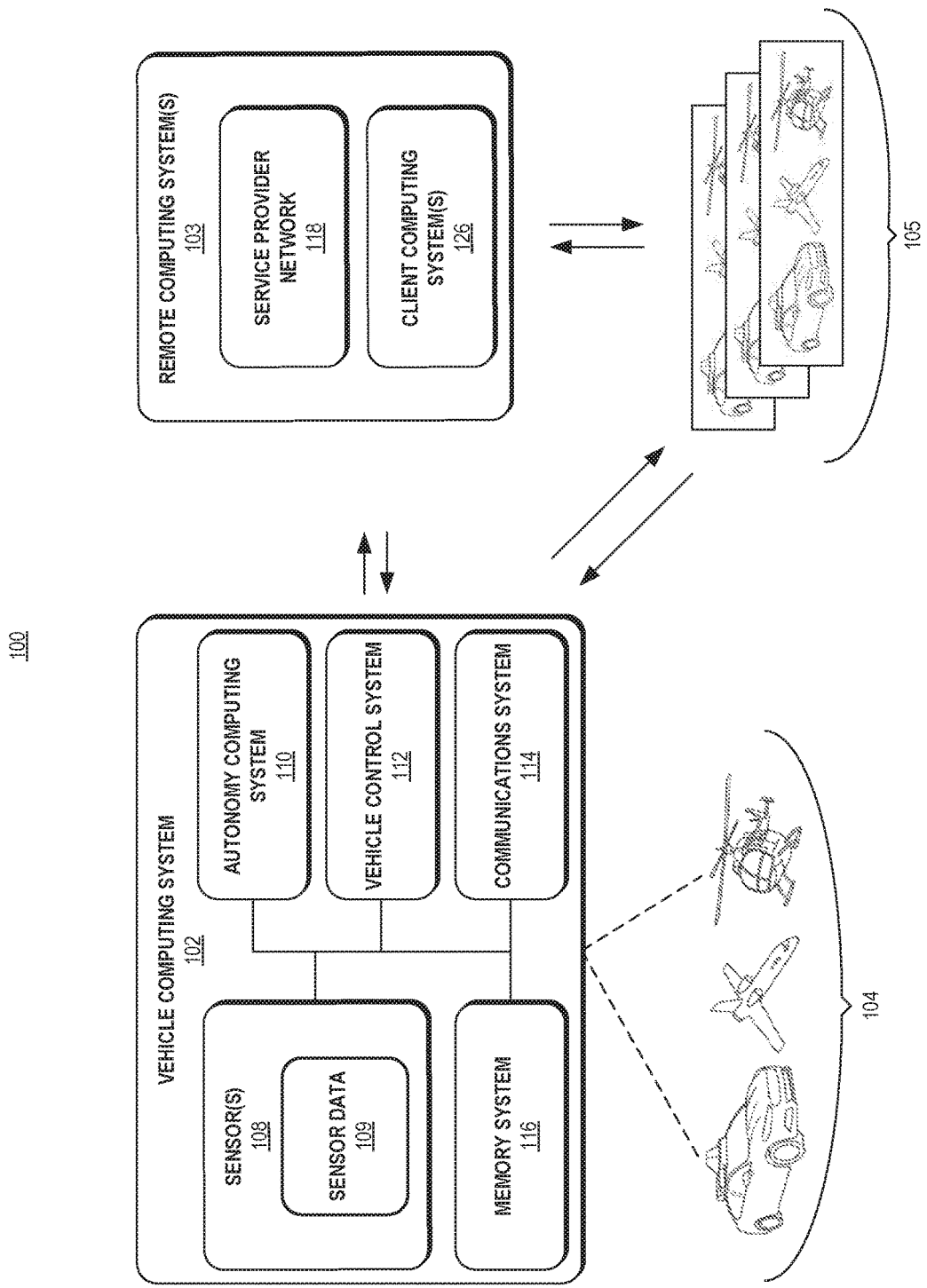
FIG. 1 depicts an example system overview according to example embodiments of the present disclosure.

Reference numerals that are repeated across plural figures are intended to identify the same components or features in various implementations.

DETAILED DESCRIPTION

Example aspects of the present disclosure are directed to coordinating a transfer of one or more assets (e.g., autonomous vehicle(s) and/or cargo) between locations associated with a transfer hub. For instance, an entity (e.g., a service provider network) can coordinate, direct, or operate a fleet of vehicles to transport cargo and provide a vehicle-based service (e.g., a transportation service) via a transportation network that includes a plurality of transfer hubs linked together via one or more transportation routes (e.g., highways, roads, etc.). The fleet can include, for example, autonomous vehicles that can drive, navigate, operate, etc. with minimal and/or no interaction from a human driver. A transfer hub in the transportation network can be associated with one or more human operators (e.g., jockeys) who can be directed by the service provider network to move one or more assets at the transfer hub from one location to another location within the transfer hub. For example, when an asset arrives at a first location associated with the transfer hub, the service provider network can assign a jockey from one or more jockeys associated with the transfer hub to move the asset from the first location to a second location associated with the transfer hub at a future time (e.g., at a time immediately after assigning the jockey, or at a later time), and direct the jockey to move the asset at such future time. The service provider network can also determine the second location within the transfer hub and determine the future time when the asset is to be moved to the second location based on an availability of the jockey. In this way, the service provider network can coordinate the transfer of assets within the transfer hub based on the availability of jockeys. Systems and methods of the present disclosure enable the transfer of one or more assets from one location to another location within a transfer hub in coordination with an availability of a jockey to transfer the assets(s).

As an example of a situation for moving one or more assets within a transfer hub, a first asset (e.g., a first autonomous vehicle transporting first cargo) and a second asset (e.g., a second autonomous vehicle transporting second cargo) can arrive at an arrival area within a first transfer hub at a first time and a second time, respectively. The first asset can be scheduled to depart the first transfer hub after the first time and travel from the first transfer hub to a second transfer hub. The second asset can be scheduled to depart the first transfer hub after the second time and travel from the first transfer hub to the second transfer hub. The service provider network can direct a jockey to move the first asset from the arrival area to a holding area within the first transfer hub until the second time when the second asset arrives at the arrival area. When the second asset arrives, the service provider network can direct a jockey to move the second asset from the arrival area to a departure area within the first transfer hub and direct a jockey to move the first asset from the holding area to the departure area. In this way, the service provider network can control the first and second assets to depart the first transfer hub at the same time and travel together to the second transfer hub.

As another example of a situation for moving one or more assets within a transfer hub, an arrival area within the transfer hub can have a finite capacity for receiving one or more assets that arrive at the transfer hub. When a first asset arrives at the arrival area at a current time, the service provider network can direct a jockey to move the first asset from the arrival area to another location within the transfer hub (e.g., a holding area, departure area, etc.) so that the arrival area can receive a second asset at a future time. Alternatively, the service provider network can determine when an amount of the total capacity being used at the arrival area reaches a threshold amount. The threshold amount can correspond to a total number of assets, a percentage of the overall capacity, or other metric indicative of available capacity. If the threshold amount is reached when the first asset arrives at the arrival area, then the service provider network can direct a jockey to move the first asset, and/or other asset(s) at the arrival area at the current time, to another location within the transfer hub.

More particularly, a service provider network can operate a fleet of one or more vehicles (e.g., ground-based vehicles) to provide a vehicle-based service, such as a transportation service, courier service, delivery service, or freight service. The vehicles can be autonomous vehicles that include various systems and devices configured to control the operation of the vehicle. For example, an autonomous vehicle can include an onboard vehicle computing system for operating the vehicle (e.g., located on or within the autonomous vehicle). In some implementations, the autonomous vehicles can operate in an autonomous mode. For example, the vehicle computing system can receive sensor data from sensors onboard the vehicle (e.g., cameras, LIDAR, RADAR), attempt to comprehend the environment proximate to the vehicle by performing various processing techniques on the sensor data, and generate an appropriate motion plan through the environment. In some implementations, the autonomous vehicles can operate in a manual mode. For example, a human operator (e.g., a driver) can manually control the autonomous vehicle. Moreover, the autonomous vehicle can be configured to communicate with one or more computing device(s) that are remote from the vehicle. As an example, the autonomous vehicle can communicate with an operations computing system that can be associated with the service provider network. The operations computing system can help the service provider network monitor, communicate with, manage, etc. the fleet of vehicles. As another example, the autonomous vehicle can communicate with one or more other vehicles (e.g., a vehicle computing system onboard each of the one or more other vehicles in the fleet), one or more other computing systems associated with the service provider network, and/or any other suitable remote computing system(s). In some implementations, the operations computing system can mediate communication between the autonomous vehicle and the computing device(s) that are remote from the vehicle.

According to aspects of the present disclosure, the service provider network can operate the fleet by grouping a plurality of autonomous vehicles in the fleet into one or more "convoy" units. The service provider network can direct the vehicles in a convoy to be moved together as a group from a first location to a second location within a transfer hub, and/or control the vehicles in the convoy to depart the transfer hub and travel together as a group to a next destination.

In some implementations, a convoy can include a lead vehicle and one or more follower vehicles. The lead vehicle can be configured to operate ahead of the follower vehicle(s), and the follower vehicle(s) can be configured to follow behind the lead vehicle. The inter-vehicle distances of the convoy can vary in embodiments from close-following (less than a foot or several feet to create an aerodynamic effect that reduces aerodynamic drag for following vehicles) to farther distances (e.g., within visual range or within short-distance communication range).

In some implementations, the service provider network can assign a human operator (e.g., an escort) to a convoy, so that the human operator can supervise, manage, and/or control autonomous vehicles in the convoy. As an example, the service provider network can assign the vehicle that includes a human operator as a lead vehicle in a convoy. The human operator can monitor the operation of the lead vehicle, the follower vehicle(s), and/or the environment (e.g., traffic, road conditions, weather, etc.) for off nominal conditions. The operation of the lead vehicle can be autonomous or manual.

According to aspects of the present disclosure, the service provider network can assign a jockey to move an asset from a first location to a second location. The asset can include an autonomous vehicle that is transporting cargo (e.g., an autonomous vehicle that is hitched to a trailer containing cargo), an autonomous vehicle that is not transporting cargo (e.g., an autonomous vehicle that is not hitched to a trailer containing cargo), or only cargo (e.g., a trailer containing cargo that is not hitched to a vehicle).

In some implementations, the service provider network can assign a jockey to move an asset and the jockey can move the asset by operating a vehicle associated with the asset.

As an example, the service provider network can assign a jockey to move an asset that includes an autonomous vehicle transporting cargo. The service provider network can assign the jockey to move the asset from a first location to a second location within a transfer hub. The jockey can manually operate the autonomous vehicle at the first location and maneuver the autonomous vehicle to the second location. Alternatively, the jockey can remotely operate the autonomous vehicle to maneuver the autonomous vehicle from the first location to the second location. In this way, the jockey can move the asset from the first location to the second location.

As another example, the service provider network can assign a jockey to move an asset that includes an autonomous vehicle not transporting cargo. The service provider network can assign the jockey to move the asset from a first location to a second location within a transfer hub. The jockey can manually operate the autonomous vehicle at the first location and maneuver the autonomous vehicle to the second location. Alternatively, the jockey can remotely operate the autonomous vehicle to maneuver the autonomous vehicle from the first location to the second location. In this way, the jockey can move the asset from the first location to the second location.

In some implementations, the service provider network can assign a jockey to move an asset and the jockey can move the asset by operating a support vehicle. The support vehicle can be an autonomous vehicle that can operate in a manual mode or an autonomous mode. The jockey can manually operate the support vehicle in manual mode, or the jockey can remotely operate the support vehicle in autonomous mode. Alternatively, the support vehicle can be a non-autonomous vehicle that the jockey can manually operate. The service provider network can configure the support vehicle as a lead vehicle in a convoy to lead one or more autonomous vehicles. Additionally, the jockey can operate the support vehicle to transport cargo, for example, by hitching a trailer containing cargo to the support vehicle.

As an example, the service provider network can assign a jockey to move a first asset that includes a first autonomous vehicle. The service provider network can assign the jockey to move the first asset from a first location to a second location within a transfer hub. The jockey can operate a support vehicle at the first location, and the service provider network can configure the support vehicle as a lead vehicle in a convoy and the service provider network can configure the first autonomous vehicle as a follower vehicle in the convoy. The jockey can maneuver the support vehicle from the first location to the second location, and the first autonomous vehicle can follow the support vehicle from the first location to the second location. In this way, the jockey can move the first asset from the first location to the second location.

As another example, the service provider network can assign a jockey to move a first asset that only includes cargo. The service provider network can assign the jockey to move the first asset from a first location to a second location within a transfer hub. The jockey can operate a support vehicle to transport the first asset. The jockey can hitch a trailer containing the first asset to the support vehicle to transport the first asset. The jockey can maneuver the support vehicle from the first location to the second location. In this way, the jockey can move the first asset from the first location to the second location.

In some implementations, the service provider network can assign a jockey to move a plurality of assets. The jockey can move the plurality of assets by operating a vehicle associated with one of the plurality of assets, or by operating a support vehicle.

As an example, the service provider network can assign a jockey to move a first asset, a second asset, and a third asset from a first location to a second location within a transfer hub. If the first, second, and third assets include first, second, and third autonomous vehicles, respectively, then the service provider network can group the first, second, and third autonomous vehicles in a convoy. The jockey can operate the first autonomous vehicle, and the service provider network can configure the first autonomous vehicle as a lead vehicle in the convoy and the second and third autonomous vehicles as follower vehicles in the convoy. The jockey can maneuver the first autonomous vehicle from the first location to the second location, and the second and third autonomous vehicles can follow the first autonomous vehicle from the first location to the second location. Alternatively, the jockey can operate a support vehicle, and the service provider network can configure the support vehicle as a lead vehicle in a convoy, and the service provider network can configure the first, second, and third autonomous vehicles as follower vehicles in the convoy. The jockey can maneuver the support vehicle from the first location to the second location, and the first, second, and third autonomous vehicles can follow the support vehicle from the first location to the second location. In this way, the jockey can move the first, second, and third assets from the first location to the second location.

As another example, the service provider network can assign a jockey to move a first asset, a second asset, and a third asset from a first location to a second location within a transfer hub. If the first asset only includes cargo, but the second and third assets include second and third autonomous vehicle, respectively, then the jockey can operate a support vehicle to transport the first asset. The jockey can hitch a trailer containing the first asset to the support vehicle to transport the first asset. The service provider network can configure the support vehicle as a lead vehicle in a convoy, and the service provider network can configure the second and third autonomous vehicles as follower vehicles in the convoy. The jockey can maneuver the support vehicle from the first location to the second location, and the second and third autonomous vehicles can follow the support vehicle from the first location to the second location. In this way, the jockey can move the first, second, and third assets from the first location to the second location.

According to aspects of the present disclosure, the service provider network can assign a jockey to move an asset based on an availability of the jockey.

In some implementations, the service provider network can determine the availability of the jockey based on one or more attributes associated with the jockey. The one or more attributes associated with a jockey can include, for example, an assignment log, a jockey location, a travel distance, a travel mode, a travel time, a shift start/end time, a license, a performance rating, and/or an assignment confirmation.

An assignment log associated with a jockey can indicate one or more assignments that are assigned to the jockey. For example, the assignment log can provide a log of pending assignments to be completed by the jockey.

The service provider network can determine an availability of a jockey for an assignment based on an assignment log associated with the jockey. For example, the service provider network can determine a number of consecutive hours that a jockey will work based on completed assignments and/or pending assignments in an assignment log associated with the jockey. If a new assignment will cause the jockey to work consecutively for more than a threshold amount (e.g., six hours), then the service provider network can determine that the jockey is unavailable for the new assignment. If a new assignment will not cause the jockey to work consecutively for more than the threshold amount, then the service provider network can determine that the jockey is available for the new assignment. Similarly, the service provider network can determine that a given jockey is unavailable to perform a time-sensitive assignment based on the assignment log associated with the jockey. For example, if a new assignment must be completed with a given time period and the assignment log associated with a jockey indicates that the jockey has a pending assignment(s) that will not be completed until after the expiration of the time period, the service provider network can determine that the jockey is unavailable for the new assignment.

A jockey location associated with a given jockey can indicate the location of the jockey at a current time and/or a future time. For example, jockey locations associated with a given jockey can include the actual location of the jockey or an expected or anticipated location of the jockey the future. In one embodiment, the service provider network can determine an availability of a jockey for an assignment based on a jockey location associated with the jockey such as a current location of the jockey or an anticipated future location of the jockey.

As an example, if a new assignment is associated with moving an asset from a first location to a second location at a current time, then the service provider network can determine that a jockey is available for the new assignment if a jockey location associated with such jockey at the current time is at the first location (or within a threshold distance or radius of such location). If the location associated with the jockey at the current time is not at the first location (or not within the threshold distance or radius of the first location), then the service provider network can determine that the jockey is unavailable for the new assignment.

As another example, if a new assignment is associated with moving an asset from a first location to a second location at a future time, then the service provider network can determine that a jockey is available for the new assignment if it is determined that a jockey location associated with the jockey at such future time will be at the first location (or within a threshold distance or radius of such location). If the jockey location associated with the jockey at the future time is not at the first location (or not within the threshold distance or radius of the first location), then the service provider network can determine that the jockey is unavailable for the new assignment.

A travel distance associated with a jockey can indicate a distance that the jockey must travel to arrive at a location of an asset. In one embodiment, the service provider network can determine an availability of a jockey for an assignment based on a travel distance associated with the jockey.

As an example, if a new assignment is for moving an asset from a first location to a second location, then the service provider network can determine that a jockey is available for the new assignment if a travel distance associated with the jockey is less than a threshold distance. If the travel distance associated with the jockey is not less than the threshold distance, then the service provider network can determine that the jockey is unavailable for the new assignment. The threshold distance can be based on, for example, a travel mode associated with the jockey and/or a travel time associated with the jockey.

As another example, a jockey can be associated with a first location at a first time and the jockey can be associated with a second location at a second time. If a new assignment is for moving an asset from a third location to a fourth location, then a travel distance associated with the jockey can be a first distance at the first time (e.g., distance between the first location and the third location) and a travel distance associated with the jockey can be a second distance at the second time (e.g., distance between the second location and the third location). The service provider network can determine that the jockey is available for the new assignment at the first time if the first distance is less than a threshold distance, and the service provider network can determine that the jockey is available for the new assignment at the second time if the second distance is less than the threshold distance.

As another example, a jockey can be associated with a first travel mode at a first time and the jockey can be associated with a second travel mode at a second time. A first threshold distance at the first time can be based on the first travel mode, and a second threshold distance at the second time can be based on the second travel mode. The service provider network can determine that the jockey is available for a new assignment at the first time if a travel distance associated with the jockey is less than the first threshold distance, and the service provider network can determine that the jockey is available for a new assignment at the second time if a travel distance associated with the jockey is less than the second threshold distance.

A travel mode associated with a jockey can indicate one or more modes of travel that the jockey can use to arrive at a location of an asset (e.g., a walking mode, a support vehicle mode, and/or other mode). Additionally, a travel time associated with a jockey can indicate an amount of time for the jockey to arrive at a location of an asset, The service provider network can determine an availability of a jockey for an assignment based on a travel mode and/or a travel time associated with the jockey. As an example, if a new assignment is for moving an asset from a first location to a second location, then the service provider network can determine that a jockey is available for the new assignment if a travel time associated with the jockey plus an estimated duration for the new assignment is less than a threshold time. If the travel time plus the estimated duration associated with the new assignment is not less than the threshold time, then the service provider network can determine that the jockey is unavailable for the new assignment. The threshold time can be based on, for example, an assignment log associated with the jockey indicating a pending assignment at a future time, and/or a scheduled departure time associated with the asset.

A shift start time associated with a jockey can indicate a time when the jockey becomes available for an assignment. A shift end time associated with the jockey can indicate a time when the jockey becomes unavailable for an assignment.

The service provider network can determine an availability of a jockey for an assignment based on a shift start time and/or a shift end time associated with the jockey. As an example, if a new assignment is for moving an asset from a first location to a second location at a first time (e.g., current time or future time), then the service provider network can determine that a jockey is available for the new assignment if the first time is after a shift start time associated with the jockey and the first time plus an estimated duration for the new assignment is before a shift end time associated with the jockey. If the first time is before the shift start time, or the first time is after the shift end time, or the first time plus the estimated duration is after the shift end time, then the service provider network can determine that the jockey is unavailable for the new assignment.

A license associated with a jockey can indicate whether the jockey is qualified for an assignment. For example, licenses may be required to perform certain assignments, such as to manually or remotely operate a vehicle, including specific types of vehicle, and/or to operate vehicles transporting certain types of cargo (e.g., hazardous materials, etc.).

The service provider network can determine an availability of a jockey for an assignment based on a license associated with the jockey. For example, if a new assignment for moving an asset requires one or more licenses, then the service provider network can determine that a jockey is available for the new assignment if the jockey is associated with the one or more licenses. If the jockey is not associated with the one or more licenses, then the service provider network can determine that the jockey is unavailable for the new assignment.

A performance rating associated with a jockey can indicate an aggregate rating associated with the jockey based on a performance of the jockey with respect to one or more completed assignments. In one embodiment, the service provider network can determine an availability of a jockey for an assignment based on a performance rating associated with the jockey.

For example, if a new assignment for moving an asset requires a minimum performance rating, then the service provider network can determine that a jockey is available for the new assignment if the jockey is associated with a performance rating that meets or exceeds the minimum performance rating. If the performance rating associated with the jockey is less than the minimum performance rating, then the service provider network can determine that the jockey is unavailable for the new assignment. Similarly, if the service provider network determines that more than one jockey is available for the new assignment, then the service provider network can assign the new assignment to an available jockey with the highest performance rating.

An assignment confirmation associated with the jockey can indicate whether the jockey has confirmed acceptance of an assignment. In one embodiment, the service provider network can determine an availability of the jockey for an assignment based on an assignment confirmation associated with the jockey.

For example, if a jockey confirms an assignment request associated with a new assignment, then the service provider network can determine that the jockey is available for the new assignment. If the jockey does not confirm the assignment request, then the service provider network can determine that the jockey is unavailable for the new assignment.

In some implementations, the service provider network can assign a jockey to move an asset based on a selection of the jockey from a pool of jockeys (e.g., a pool of jockeys associated with a transfer hub). The pool of jockeys associated with a transfer hub can include one or more local jockeys who work at the transfer hub and/or one or more temporary jockeys who are temporarily at the transfer hub.

As an example of a temporary jockey, an escort that is assigned to a first convoy can arrive at a transfer hub with the first convoy. When the first convoy arrives at a first location within the transfer hub, the service provider network can revoke the assignment of the escort from the first convoy and assign the escort to move one or more assets from the first location to a second location within the transfer hub (e.g., as a temporary jockey). The service provider network can then assign the escort to a second convoy and the escort can depart the transfer hub with the second convoy. Alternatively, the service provider network can assign a plurality of assignments to the escort before assigning the escort to the second convoy.

As an example of selecting a jockey from a pool of jockeys, the service provider network can determine one or more jockeys that are available for an assignment from the pool of jockeys. If more than one jockey is available for the assignment, then the service provider network can select a jockey from the available jockeys, and assign the assignment to the selected jockey.

According to aspects of the present disclosure, when the service provider network generates an assignment to move an asset that is currently located at a first location, the service provider network can determine to move the asset to a second location based on an availability of a jockey. The service provider network can assign the jockey to move the asset from the first location to the determined second location. The service provider network can determine the second location based on, for example, a travel time associated with the jockey, a shift end time associated with the jockey, and/or an assignment confirmation associated with the jockey.

As an example, the service provider network can determine that an asset is at a first location and the service provider network can determine that either a second location or a third location can receive the asset from the first location. The service provider network can determine that a jockey is unavailable for a first new assignment to move the asset from the first location to the second location at a first time, but that the jockey is available for a second new assignment to move the asset from the first location to the third location at the first time. The service provider network can assign the jockey to move the asset from the first location to the third location at the first time based on the availability of the jockey.

In the above example, the service provider network can determine, for instance, that the jockey is unavailable for the first new assignment based on a travel time associated with the jockey. In particular, the service provider network can determine that a travel time associated with the jockey to arrive at the first location plus an estimated duration associated with the first new assignment is not less than a threshold time. Similarly, the service provider network can determine, for example, that the jockey is available for the second new assignment based on a determination that a travel time associated with the jockey to arrive at the first location plus an estimate duration associated with the second new assignment is less than the threshold time.

In the above example, the service provider network can also determine, for instance, that the jockey is unavailable for the first new assignment based on a shift end time associated with the jockey. In particular, the service provider network can determine that the first time plus an estimated duration associated with the first new assignment is after the shift end time associated with the jockey. Similarly, the service provider network can determine that the jockey is available for the second new assignment based on a determination that the first time plus an estimate duration associated with the second new assignment is before the shift end time.

In the above example, the service provider network can determine, for instance, that the jockey is unavailable for the first new assignment based on an assignment confirmation associated with the jockey. In particular, the service provider network can determine that the jockey has not confirmed an assignment request associated with the first new assignment. Similarly, the service provider network can determine that the jockey is available for the second new assignment based on a determination that the jockey has confirmed an assignment request associated with the second new assignment.

According to aspects of the present disclosure, when the service provider network generates an assignment to move an asset from a first location to a second location, the service provider network can determine a time to schedule the assignment based on an availability of a jockey. The service provider network can assign the jockey to move the asset from the first location to the second location at the determined time. The service provider network can determine the time based on, for example, an assignment log associated with the jockey, a jockey location associated with the jockey, a travel distance associated with the jockey, and/or a shift start/end time associated with the jockey.

As an example, the service provider network can determine that an asset can be moved from a first location to a second location at either a first time or a second time. The service provider network can determine that a jockey is unavailable for a first new assignment to move the asset from the first location to the second location at the first time, but that the jockey is available for a second new assignment to move the asset from the first location to the second location at the second time. The service provider network can assign the jockey to move the asset from the first location to the second location at the second time based on the availability of the jockey.

In the above example, the service provider network can determine that the jockey is unavailable for the first new assignment based on an assignment log associated with the jockey. In particular, the service provider network can determine based on the assignment log that the first new assignment will cause the jockey to work consecutively for more than a threshold amount or that the first new assignment cannot be completed within a given time period due to conflicting assignments pending within the jockey's log. The service provider network can determine that the jockey is available for the second new assignment based on a determination that the second new assignment will not cause the jockey to work consecutively for more than the threshold amount or that conflicting assignments do not exist.

In the above example, the service provider network can determine that the jockey is unavailable for the first new assignment based on a location associated with the jockey. In particular, the service provider network can determine that a jockey location associated with the jockey at the first time is not at the first location (or not within a threshold distance of the first location). The service provider network can determine that the jockey is available for the second new assignment based on a determination that a jockey location associated with the jockey at the second time is at the first location (or not within a threshold distance of the first location).

In the above example, the service provider network can determine that the jockey is unavailable for the first new assignment based on a travel distance associated with the jockey. In particular, the service provider network can determine that the travel distance associated with the jockey at the first time is not less than a first threshold distance. The service provider network can determine that the jockey is available for the second new assignment based on a determination that the travel distance associated with the jockey at the second time is less than a second threshold distance.

In the above example, the service provider network can determine that the jockey is unavailable for the first new assignment based on a shift start time and/or a shift end time associated with the jockey. In particular, the service provider network can determine that the first time is before the shift start time, or the first time is after the shift end time, or the first time plus an estimated duration for the first new assignment is after the shift end time. The service provider network can determine that the jockey is available for the second new assignment based on a determination that the second time is after the shift start time and the second time plus an estimated duration for the second new assignment is before the shift end time.

According to aspects of the present disclosure, the service provider network can assign a jockey to move one or more assets and schedule the assignment at a future time. The service provider network can determine one or more future times when the asset(s) can be moved and schedule the assignment at one of the future time(s) based on an availability of a jockey for the assignment.

In some implementations, the service provider network can schedule an assignment to move the asset(s) at a future time so that the asset(s) can be grouped with one or more other assets arriving at the transfer hub.

As an example, the service provider network can identify one or more first assets at a transfer hub at a current time, and identify one or more second assets that will arrive at the transfer hub at a future time. The second asset(s) can include one or more additional assets that are different from the first asset(s). The service provider network can group the first and second assets and schedule an assignment to move the grouped assets at one or more future times after the second assets arrive at the transfer hub. The service provider network can schedule the assignment at one of the future time(s) based on an availability of a jockey for the assignment. In this way, a jockey can be assigned to move the grouped assets together, instead of the service provider network assigning one or more jockeys to move the assets in the group separately, at different times.

In some implementations, the service provider network can schedule an assignment to move the asset(s) at a future time based on a scheduled departure time associated with asset(s).

As an example, an asset can be associated with a scheduled departure time from a transfer hub. The service provider network can direct the asset to be held at a dropyard within the transfer hub between an arrival time of the asset at the transfer hub and the scheduled departure time. The service provider network can schedule an assignment to move the asset from the dropyard to a launch zone at one or more future times before the scheduled departure time. The service provider network can schedule the assignment at one of the future time(s) based on an availability of a jockey for the assignment.

In some implementations, the service provider network can schedule an assignment to move the asset(s) at a future time based on a priority associated with the asset(s).

As an example, a first asset associated with a normal cargo-type can arrive at the transfer hub, followed by a second asset associated with a hazardous cargo-type. The service provider network can prioritize a first assignment to move the second asset to a dropyard associated with being capable of holding hazardous cargo, ahead of a second assignment to move the first asset. The service provider network can schedule the first assignment at a first time and schedule the second assignment at a second time that is later than the first time. The service provider network can assign the first assignment to a jockey based on an availability of the jockey for the first assignment and assign the second assignment to a jockey based on an availability of the jockey for the second assignment.

As another example, if a scheduled departure time associated with a first asset at the transfer hub is a first time, and a scheduled departure time associated with a second asset at the transfer hub is a second time that is later than the first time, then the service provider network can prioritize a first assignment to move the first asset ahead of a second assignment to move the second asset. The service provider network can schedule the first assignment at a future time before the first time and schedule the second assignment at a future time before the second time. The service provider network can assign the first assignment to a jockey based on an availability of the jockey for the first assignment and schedule the second to a jockey based on an availability of the jockey for the second assignment.

As another example, the service provider network can determine a first assignment to move a first asset from a landing zone to a first dropyard and determine a second assignment to move second and third assets from the landing zone to a second dropyard. The service provider network can group the second and third assets together, and prioritize the second assignment to move the grouped assets ahead of the first assignment. The service provider network can schedule the second assignment at a first time and schedule the first assignment at a second time that is later than the first time. The service provider network can assign the second assignment to a jockey based on an availability of the jockey for the second assignment and assign the first assignment to a jockey based on an availability of the jockey for the first assignment. Alternatively, if a jockey is unavailable for the second assignment at the first time, but the jockey is available for the second assignment at a third time that is later than the second time, then the service provider network can schedule the second assignment at the third time.

According to aspects of the present disclosure, the service provider network can provide a vehicle-based service via a transportation network. The transportation network can include a plurality of transfer hubs associated with various geographic locations, and a plurality of transportation routes connecting the transfer hubs. The service provider network can control one or more autonomous vehicles in the fleet to transport cargo from a first location (e.g., a pick-up location) to a second location (e.g., a drop-off location) by using the transportation network.

As an example, a client can contract to transport cargo from a pick-up location to a drop-off location. A driver associated with the client can operate a vehicle to pick-up the cargo from the pick-up location, and transport the cargo to a first transfer hub that is proximate to the pick-up location. The service provider network can control an autonomous vehicle in the fleet to autonomously transport the cargo to reach a second transfer hub that is proximate to the drop-off location (e.g., directly from the first transfer hub or via one or more other transfer hubs). If the vehicle operated by the driver associated with the client is an autonomous vehicle in the fleet, then the service provider network can optionally control the same vehicle to autonomously transport the cargo. If the vehicle operated by the driver associated with the client is not in the fleet, then the service provider network can direct the cargo to be transferred to an autonomous vehicle in the fleet at the first transfer hub. When the cargo arrives at the second transfer hub, another driver associated with the client can operate a vehicle to transport the cargo from the second transfer hub to the drop-off location.

As another example, the service provider network can control an autonomous vehicle in the fleet to pick-up cargo at a pick-up location, and transport the cargo to a first transfer hub that is proximate to the pick-up location. The service provider network can control an autonomous vehicle in the fleet to transport the cargo from the first transfer hub to a second transfer hub that is proximate to a drop-off location (e.g., directly from the first transfer hub or via one or more other transfer hubs). The service provider network can control an autonomous vehicle in the fleet to transport the cargo from the second transfer hub to the drop-off location.

In some implementations, the service provider network can direct cargo to be transferred from one vehicle to another vehicle at a transfer hub.

As an example of a situation for transferring cargo between vehicles, a driver associated with a client can operate a vehicle to transport cargo from a first location (e.g., pick-up location) to a transfer hub. The service provider network can direct the cargo to be transferred from the vehicle to an autonomous vehicle in the fleet. The service provider network can then control the autonomous vehicle to autonomously transport the cargo.

As another example of a situation for transferring cargo between vehicles, the service provider network can control an autonomous vehicle in the fleet to autonomously transport cargo to a transfer hub. The service provider network can direct the cargo to be transferred from the autonomous vehicle to a vehicle operated by a driver associated with a client. The driver can transport the cargo from the transfer hub to a second location (e.g., drop-off location).

As another example of a situation for transferring cargo between vehicles, when a first autonomous vehicle transporting cargo arrives at a transfer hub, the service provider network can obtain diagnostics information associated with the first autonomous vehicle from the first autonomous vehicle. The service provider can determine that the first autonomous vehicle is in need of a maintenance/repair service based on the diagnostics information received from the vehicle, and queue the vehicle for the maintenance/repair service at the transfer hub. Meanwhile, the service provider network can direct the cargo from the first autonomous vehicle to be transferred to a second autonomous vehicle. The service provider network can control the second autonomous vehicle to transport the cargo from the transfer hub to a next destination (e.g., another transfer hub, drop-off location, etc.).

As an example of transferring cargo between vehicles, when a first vehicle transporting cargo arrives at a transfer hub, the service provider network can direct a trailer containing the cargo that is hitched to the first vehicle to be unhitched from the first vehicle. The service provider network can direct the trailer to be hitched to a second vehicle, and the service provider network can control the second vehicle to transport the cargo from the transfer hub to a next destination (e.g., another transfer hub, drop-off location, etc.).

As another example of transferring cargo between vehicles, when a first vehicle transporting cargo arrives at a transfer hub, the service provider network can direct the cargo to be transferred from a first trailer that is hitched, or was previously hitched, to the first vehicle to a second trailer that is hitched, or will be hitched, to a second vehicle. The service provider network can control the second vehicle to transport the cargo from the transfer hub to a next destination (e.g., another transfer hub, drop-off location, etc.).

In some implementations, the service provider network can direct an asset (e.g., autonomous vehicle(s) and/or cargo) to be held at a transfer hub for a duration of time.

As an example, an autonomous vehicle that is currently at the transfer hub can be scheduled to depart the transfer hub via a first transportation route. Based on a determination that there is inclement weather affecting the first transportation route that makes the first transportation route unsafe for the autonomous vehicle to travel, the service provider network can direct the autonomous vehicle to be held at the transfer hub until the weather is clear. In particular, the service provider network can assign a jockey to move the autonomous vehicle to a holding area within the transfer hub until the weather is clear.

As another example, the service provider network can group a first autonomous vehicle that is currently at the transfer hub into a first convoy with one or more second autonomous vehicles that will arrive at the transfer hub at one or more future times. The service provider network can direct the first autonomous vehicle to be held at the transfer hub until the second autonomous vehicle(s) arrive, so that the first autonomous vehicle and the second autonomous vehicle(s) in the first convoy can depart the transfer hub together. In particular, the service provider network can assign a jockey to move the first autonomous vehicle to a holding area within the transfer hub until the second autonomous vehicle(s) arrive.

As another example, when an autonomous vehicle transporting a first cargo arrives at the transfer hub, the service provider network can direct a trailer containing the first cargo to be held at the transfer hub. In particular, the service provider network can assign a jockey to move the autonomous vehicle to a holding area and direct the trailer to be unhitched from the autonomous vehicle at the holding area. The service provider network can direct another trailer containing a second cargo to be hitched to the autonomous vehicle and control the autonomous vehicle to perform other tasks, such as, for example, transporting the second cargo.

As another example, when an autonomous vehicle transporting a first cargo arrives at the transfer hub, the service provider network can direct the first cargo to be held at the transfer hub. In particular, the service provider network can assign a jockey to move the autonomous vehicle to a holding area and direct the first cargo to be removed from the trailer at the holding area. The service provider network can optionally direct the first cargo to be placed in another trailer that is being held at the transfer hub (e.g., at the holding area).

According to aspects of the present disclosure, a transfer hub can include or be associated with one or more landing zones (e.g., an arrival area(s)), one or more dropyards (e.g., a holding area(s)), and one or more launch zones (e.g., a departure area(s)). In particular, the landing zone(s) can be a location (e.g., proximate to an exit ramp of a highway road) for receiving one or more incoming autonomous vehicles, and the dropyard(s) can be a location for holding one or more autonomous vehicles and/or cargo. In some implementations, the dropyard(s) can also be a location for receiving one or more vehicles transporting cargo from a pick-up location to the transfer hub, or for receiving one or more vehicles transporting cargo from the transfer hub to a drop-off location. The incoming autonomous vehicle(s) can arrive at one of the landing zone(s) at the transfer hub and come to a stop. The incoming autonomous vehicle(s) may or may not be transporting cargo when the vehicle(s) arrive at a landing zone, and the vehicles transporting cargo between the transfer hub and a pick-up/drop-off location may or may not be autonomous vehicles.

In some implementations, when incoming autonomous vehicle(s) arrive at a landing zone, the service provider network can direct one or more autonomous vehicles that are already at the landing zone (e.g., autonomous vehicle(s) that have previously arrived) to be moved from the landing zone to one or more other locations within the transfer hub. The other location(s) can include, for example, one or more of the dropyard(s) or launch zone(s) within the transfer hub. In particular, the service provider network can assign a jockey to move the autonomous vehicle(s) from the landing zone to one of the dropyard(s) at a first time in order to hold the vehicle(s) and/or cargo being transported by the vehicle(s) at the dropyard. Additionally, the service provider network can assign a jockey to move the autonomous vehicle(s) from the dropyard to one of the launch zone(s) at a second time so that the vehicle(s) and any cargo being transported by the vehicle(s) can depart the transfer hub. Alternatively, the service provider network can assign a jockey to move the autonomous vehicle(s) from the landing zone to one of the launch zone(s) so that the vehicle(s) and any cargo being transported by the vehicle(s) can depart the transfer hub. More generally, the service provider network can direct an asset (e.g., autonomous vehicle(s) and/or cargo) to be moved from any one location to any other location within the transfer hub, such as, for example, from one dropyard to another dropyard, or from a dropyard to a launch zone.

In some implementations, the service provider network can direct an asset to be moved from one location to another location within the transfer hub based on a cargo-type associated with the asset. In particular, the service provider network can direct an autonomous vehicle to be moved based on a cargo-type associated with cargo being transported by the autonomous vehicle. The service provider network can also direct a trailer containing cargo, or direct cargo contained in the trailer, to be moved based on a cargo-type associated with the cargo.

As an example, the transfer hub can include a dropyard associated with being capable of holding hazardous cargo. The dropyard can include characteristics or facilities specifically tailored to hold an autonomous vehicle with a hazardous cargo and/or the hazardous cargo itself (e.g., an isolated location, special safety equipment, etc.). Based on a determination that an autonomous vehicle transporting hazardous cargo is at a landing zone, or will be arriving at the landing zone, the service provider network can assign a jockey to move the autonomous vehicle from the landing zone to the dropyard associated with being capable of holding hazardous cargo. In example embodiments, the service provider network can select the dropyard dynamically and/or automatically based on the determination that the autonomous vehicle includes hazardous cargo.

As another example, the transfer hub can include a dropyard associated with being capable of holding climate-controlled cargo. The dropyard can include characteristics or facilities specifically tailored to hold an autonomous vehicle with a climate-controlled cargo and/or the climate-controlled cargo itself (e.g., climate-controlled holding area, etc.). Based on a determination that an autonomous vehicle transporting a climate-controlled cargo is at a landing zone, or will be arriving at the landing zone, the service provider network can assign a jockey to move the autonomous vehicle from the landing zone to the dropyard associated with being capable of holding climate-controlled cargo. In example embodiments, the service provider network can select the dropyard dynamically and/or automatically based on the determination that the autonomous vehicle includes climate-controlled cargo.

In some implementations, the service provider network can direct an asset (e.g., autonomous vehicle and/or cargo) to be moved from a first location to a second location within the transfer hub based on an availability of free space (e.g., available capacity) at the first location.

As an example, a first autonomous vehicle can arrive at a landing zone within the transfer hub. Based on a determination that one or more second autonomous vehicles will arrive at the landing zone at a future time, and a determination that there is insufficient free space available at the landing zone for receiving the second autonomous vehicle(s) at the future time, the service provider network can assign a jockey to move the first autonomous vehicle from the landing zone to a dropyard or other location within the transfer hub. If it is determined that the second autonomous vehicle(s) will not arrive at the future time, or if it is determined that there is free space available for receiving the second autonomous vehicle(s) at the future time, then the service provider network can direct the first autonomous vehicle to be held at the landing zone. Alternatively, even if it is determined that the second autonomous vehicle(s) will not arrive at the future time, or that there is free space available for receiving the second autonomous vehicle(s) at the future time, the service provider network can still assign a jockey to move the first autonomous vehicle from the landing zone to dropyard or other location within the transfer hub (e.g., to hold hazardous/climate-controlled cargo being transported by the first autonomous vehicle at a dropyard associated with being capable of holding hazardous/climate-controlled cargo, to group the first autonomous vehicle with one or more autonomous vehicles at the dropyard or other location, etc.).

In some implementations, the service provider network can direct an asset (e.g., autonomous vehicle and/or cargo) to be moved from a first location to a second location within the transfer hub based on an availability of free space (e.g., available capacity) at the second location.

As an example, the service provider network can direct asset(s) from a landing zone to a first dropyard within the transfer hub until the first dropyard is at capacity. When there is insufficient free space available at the first dropyard, the service provider network can direct asset(s) from the landing zone to a second dropyard within the transfer hub until the second dropyard is at capacity. In this way, the service provider network can direct asset(s) to each of the dropyard(s) within the transfer hub until each dropyard is at capacity.

As another example, the service provider network can determine an available free space at each of the dropyard(s) within the transfer hub, and direct an asset from a landing zone to a dropyard with the most available free space.

As another example, the service provider network can group a plurality of assets at a landing zone, and direct the group of assets to be moved together. The service provider network can determine an available free space at each of the dropyard(s) within the transfer hub to identify a dropyard with available free space to receive all of the assets in the group, and direct the group of assets to be moved from the landing zone to the identified dropyard.

In some implementations, the service provider network can direct an asset (e.g., autonomous vehicle and/or cargo) to be moved from one location to another location within the transfer hub based on an arrival time associated with the asset. For example, each cargo can be associated with a first location (e.g., a pick-up location), a second location (e.g., a drop-off location), and a cargo route from the first location to the second location via a plurality of transfer hubs. The cargo route can include scheduled arrival time(s) for arriving at each of the transfer hub(s) along the route. The scheduled arrival time(s) associated with a cargo can be imputed to an autonomous vehicle that is, or will be, transporting the cargo.

As an example, an asset can be associated with a scheduled arrival time at a first transfer hub. The asset can arrive at a landing zone within the first transfer hub at the scheduled arrival time. The service provider network can direct the asset to be moved from the landing zone to another location within the transfer hub when the asset arrives, or at a time after the asset arrives.

In some implementations, the service provider network can direct an asset (e.g., autonomous vehicle(s) and/or cargo) to be moved from one location to another location within the transfer hub based on a departure time associated with the asset. For example, each cargo can be associated with a first location (e.g., a pick-up location), a second location (e.g., a drop-off location), and a cargo route from the first location to the second location via a plurality of transfer hubs. The cargo route can include scheduled departure time(s) for departing each of the transfer hub(s) along the route. The scheduled departure time(s) associated with a cargo can be imputed to an autonomous vehicle that is, or will be, transporting the cargo.

As an example, an asset can be associated with a scheduled departure time from a first transfer hub. The asset can arrive at a landing zone within the first transfer hub before the scheduled departure time from the first transfer hub. The service provider network can direct the asset to be moved from the landing zone to a launch zone within the first transfer hub at the scheduled departure time, or at a time before the scheduled departure time. Alternatively, the service provider network can direct the asset to be moved from the landing zone to a dropyard for a duration, and then direct the asset to be moved from the dropyard to a launch zone at or before the scheduled departure time.

As another example, each of the dropyard(s) within the transfer hub can be associated with a travel time between the dropyard and each landing zone. If a departure time of an asset is soon (e.g., between a first threshold value and a second threshold value) after the asset arrives, then the service provider network can direct the asset to be moved to a dropyard associated with a short travel time so that the asset is not in the middle of being moved at the departure time. If the departure time of the asset is later (e.g., after the second threshold value), then the service provider network can direct the asset to be moved to a dropyard associated with a longer travel time.

As another example, each of the dropyard(s) within the transfer hub can be associated with a travel time between the dropyard and each launch zone. If a departure time of an asset is soon (e.g., between a first threshold value and a second threshold value) after the asset arrives, then the service provider network can direct the asset to be moved to a dropyard associated with a short travel time so that the asset can be quickly moved to a launch zone at the departure time. If the departure time of the asset is later (e.g., after the second threshold value), then the service provider network can direct the asset to be moved to a dropyard associated with a longer travel time.

As another example, if a departure time of an asset is very soon (e.g., before a first threshold value) after the asset arrives at a landing zone, then the service provider network can direct the asset to be moved from the landing zone to a launch zone within the transfer hub.

In some implementations, the service provider network can direct an asset (e.g., autonomous vehicle(s) and/or cargo) to be moved from one location to another location within the transfer hub based on a next destination associated with the asset. For example, each cargo can be associated with a pick-up location, drop-off location, and a cargo route from the pick-up location to the drop-off location via one or more transfer hubs. The next destination associated with a cargo can correspond to the next transfer hub along the cargo route from a current location associated with the cargo. Alternatively, the next destination associated with a cargo can correspond to the drop-off location. The next destination associated with a cargo can be imputed to an autonomous vehicle that is, or will be, transporting the cargo.

As an example, the service provider network can identify a plurality of assets at a landing zone that are associated with the same next destination. The service provider network can group the plurality of assets, and direct the assets to be moved as a group to a dropyard that can receive the plurality of assets.

As another example, the service provider network can identify a first asset at a landing zone that is associated with the same next destination as a second asset at a dropyard within the transfer hub. The service provider network can direct the first asset to be moved from the landing zone to the dropyard with the second asset, and group the first and second assets at the dropyard. Alternatively, the service provider network can group the first and second assets together, and then direct the first asset to be moved from the landing zone to the dropyard with the second asset.

As another example, the transfer hub can include a launch zone associated with each of one or more transportation routes connecting the transfer hub. The service provider network can determine which transportation route that an asset will travel when departing the transfer hub based on a cargo route associated with the asset, and direct the asset to be moved from a dropyard within the transfer hub to the launch zone corresponding to the determined transportation route.

In some implementations, the service provider network can direct an autonomous vehicle to be moved from one location to another location within a transfer hub, based on an operational status associated with the autonomous vehicle. The operational status can indicate, for example, that the autonomous vehicle is operating normally, or that the autonomous vehicle is in need of one or more maintenance/repair services. The maintenance/repair service(s) can include, for example, a refueling service, engine maintenance service, component repair/replacement service, component update/upgrade service, check diagnostics service, etc.

As an example, a transfer hub can include a dropyard associated with being capable of performing one or more maintenance/repair services. The dropyard can include characteristics or facilities specifically tailored for performing the maintenance/repair service(s) (e.g., tools, inventory, technicians, etc.). Based on a determination that an autonomous vehicle in need of one or more maintenance/repair services is at a landing zone, or will be arriving at the landing zone, the service provider network can assign a jockey to move the autonomous vehicle from the landing zone to the dropyard associated with performing the maintenance/repair service(s). In example embodiments, the service provider network can select the dropyard dynamically and/or automatically based on the determination that the autonomous vehicle is in need of the maintenance/repair service(s).

As another example, an autonomous vehicle can arrive at the transfer hub with an operational status indicating that the autonomous vehicle requires a refueling service. The service provider network can determine the operational status of the autonomous vehicle, and direct the vehicle to be moved from the landing zone to a refueling area within the transfer hub where the refueling service can be performed. The refueling area can be located within a dropyard of the transfer hub. When the refueling service is complete, the service provider network can direct the autonomous vehicle to be moved to a holding area within the dropyard or another location within the transfer hub.

As another example, an autonomous vehicle can arrive at the transfer hub with an operational status indicating that the autonomous vehicle requires an engine maintenance service. The service provider network can determine the operational status of the autonomous vehicle, and direct the vehicle to be moved from the landing zone to a maintenance area within the transfer hub where the engine maintenance service can be performed. The maintenance area can be located within a dropyard of the transfer hub. When the engine maintenance service is complete, the service provider network can direct the autonomous vehicle to be moved to a holding area within the dropyard or another location within the transfer hub.

As another example, an autonomous vehicle can arrive at the transfer hub with an operational status indicating that the autonomous vehicle requires one or more maintenance/repair services. The service provider network can determine the operational status of the autonomous vehicle, and direct the vehicle to be moved from the landing zone to one or more corresponding areas within the transfer hub where the maintenance/repair service(s) can be performed. The corresponding area(s) can be located within one or more dropyards of the transfer hub. When the maintenance/repair service(s) are complete, the service provider network can direct the autonomous vehicle to be moved to a holding area within one of the dropyard(s) or another location within the transfer hub.

In some implementations, the service provider network can direct an asset to be moved from one location to another location within the transfer hub based on one or more other assets that are grouped with the asset.

As an example, the service provider network can group a first asset at a landing zone with a second asset at a first dropyard within the transfer hub. If the service provider network determines that the first dropyard has available free space for receiving the first asset, then the service provider network can direct the first asset to be moved to the first dropyard. If the service provider network determines that the first dropyard does not have available free space to receive the first asset, then the service provider network can direct the first asset to be moved to a second dropyard, and direct the second asset to be moved from the first dropyard to the second dropyard. Alternatively, the service provider network can direct the first asset to be moved to the second dropyard, and direct the first asset to be moved from the second dropyard to the first dropyard when there is available free space at the first dropyard.

In some implementations, the service provider network can direct an asset to be moved from one location to another location within the transfer hub based on a distance between with the locations.

As an example, a first dropyard can be a first distance from a landing zone, and a second dropyard can be a second distance that is farther from the landing zone. If there is available free space at the first dropyard, then the service provider network can direct an asset to be moved from the landing zone to the first dropyard. If the first dropyard is at capacity, then the service provider network can direct the asset to be moved from the landing zone to the second dropyard, and direct the asset to be moved from the second dropyard to the first dropyard when there is available free space at the first dropyard. In this way, the service provider network can direct asset(s) to be moved to each of the dropyard(s) within the transfer hub in order of increasing distance from the landing zone so that a travel distance can be minimized.

As another example, a first dropyard can be a first distance from a launch zone corresponding to an asset, and a second dropyard can be a second distance that is farther from the launch zone. If there is available free space at the first dropyard, then the service provider network can direct the asset to be moved to the first dropyard. If the first dropyard is at capacity, then the service provider network can direct the asset to be moved to the second dropyard. When there is available free space at the first dropyard, the service provider network can direct the asset to be moved from the second dropyard to the first dropyard. In this way, the service provider network can direct the asset to be held at the nearest available dropyard to the launch zone so that the vehicle can be quickly moved to the launch zone at a departure time.

In some implementations, the service provider network can direct an autonomous vehicle to be moved from one location to another location within the transfer hub based on an availability of an escort for the autonomous vehicle.

As an example, a first escort can be assigned to a first convoy, and the first escort can arrive at the transfer hub with the first convoy. When the first convoy arrives at the transfer hub, the service provider network can revoke the assignment of the first escort from the first convoy. The service provider network can assign a second escort to the first convoy to escort the first convoy from the transfer hub to a next destination of the first convoy. The service provider network can determine when a second escort is available to be assigned to the first convoy at the transfer hub, and direct the convoy to be held at the transfer hub until the second escort is available. When the second escort is available, the service provider network can assign the second escort and direct the first convoy to be moved to a launch zone within the transfer hub.

As another example, a first escort can be assigned to a first convoy, and the first escort can arrive at the transfer hub with the first convoy. When the first convoy arrives at the transfer hub, the service provider network can revoke the assignment of the first escort from the first convoy and direct one or more first autonomous vehicles in the first convoy to be removed from the first convoy and held at the transfer hub. In addition, the service provider network can direct one or more second autonomous vehicles at the transfer hub to be added to the first convoy. The service provider network can determine when a second escort is available to be assigned to the first convoy at the transfer hub, and direct the one or more second autonomous vehicles to be moved to a location of the first convoy when the second escort is available.

The systems and methods described herein may provide a number of technical effects and benefits. For instance, by assigning a jockey to move an asset(s) away from a landing zone of a transfer hub, free space can be made available at the landing zone for an asset(s) arriving at a future time. Additionally, by assigning a jockey to move the asset(s) based on an availability of the jockey, the movement of the asset(s) can be scheduled at a future time and/or a location to which the asset(s) is to be moved can be dynamically determined in coordination with the availability of the jockey. In this way, the present disclosure enables improved utilization of the transfer hub, while minimizing a frequency at which autonomous vehicles are moved from one location to another location. Furthermore, by determining a location for moving asset(s) based on different criteria, and grouping asset(s) to move as a group, the present disclosure enables efficient use of resources available at the transfer hub, such as a capacity for receiving asset(s) and the availability of jockey(s) for moving the asset(s).

The systems and methods described herein may also provide resulting improvements to computing technology tasked with providing a vehicle-based service, coordinating jockeys to provide a vehicle-based service, and/or managing a fleet of vehicles to provide a vehicle-based service. For example, the systems and methods described herein may provide improvements in a utilization of the fleet of vehicles for providing the vehicle-based service, resulting in greater throughput and reduced energy expenditure by reducing a likelihood of an autonomous vehicle needing to wait for available free space when arriving at a transfer hub.

With reference now to the FIGS., example embodiments of the present disclosure will be discussed in further detail. FIG. 1 depicts an example system 100 according to example embodiments of the present disclosure. The system 100 can include a vehicle computing system 102 associated with a vehicle 104 and one or more remote computing systems 103. The system 100 can also include one or more additional vehicles 105, each including a respective vehicle computing system (not shown). In one embodiment, the remote computing system(s) 103 may include or be associated with a service provider network 118 and one or more client computing systems 126. In general, the service provider network 118 may include or be associated with one or more computing systems that allow the service provider network 118 to provide a vehicle-based service, such as one or more of the example vehicle-based services described herein.

In some implementations, the vehicle computing system 102, the remote computing system(s) 103 (e.g., the service provider network 118 and the client computing system(s) 126), and vehicle(s) 105 (e.g., vehicle computing system associated with each of the vehicle(s) 105) can be remote from each other and communicate with each other remotely.

In some implementations, the vehicle 104 can be part of a fleet of vehicles managed by the service provider network 118. Additionally, the vehicle(s) 105 can be part of the fleet of vehicles managed by the service provider network 118.

In one embodiment, the service provider network 118 can manage the vehicle 104 via the vehicle computing system 102. Additionally, the service provider network 118 can manage the vehicle(s) 105 via a respective vehicle computing system associated with each of the vehicle(s) 105. The service provider network 118 can obtain data indicative of a service request from a client, for example, via a client computing system 126 associated with the client. The service provider network 118 can select the vehicle 104 to provide the vehicle service requested by the client. The service provider network 118 can provide the vehicle computing system 102 with data indicative of cargo designated for autonomous transport, and control the vehicle 104 to provide the vehicle-based service.

The vehicle 104 incorporating the vehicle computing system 102 can be a ground-based autonomous vehicle (e.g., car, truck, bus), an air-based autonomous vehicle (e.g., airplane, drone, helicopter, or other aircraft), or other types of vehicles (e.g., boat, ship, or other watercraft). The vehicle 104 can be an autonomous vehicle that can drive, navigate, operate, etc. with minimal and/or no interaction from a human driver.

The vehicle 104 can include one or more sensors that can acquire sensor data indicative of one or more objects proximate to the vehicle 104, and/or indicative of one or more conditions. The objects can include, for example, pedestrians, vehicles, bicycles, attached cargo, and/or other objects. The conditions can include, for example, whether a trailer including cargo is hitched to the vehicle 104, whether a human operator is present in the vehicle 104, whether one or more diagnostic checks are successfully completed, a geographic location of the vehicle 104, and/or other conditions.

The vehicle 104 can include an autonomy computing system that can obtain the sensor data from the sensors, attempt to comprehend the surrounding environment by performing various processing techniques on the sensor data (and/or other data), and generate an appropriate motion plan through such surrounding environment.

Figure 2:
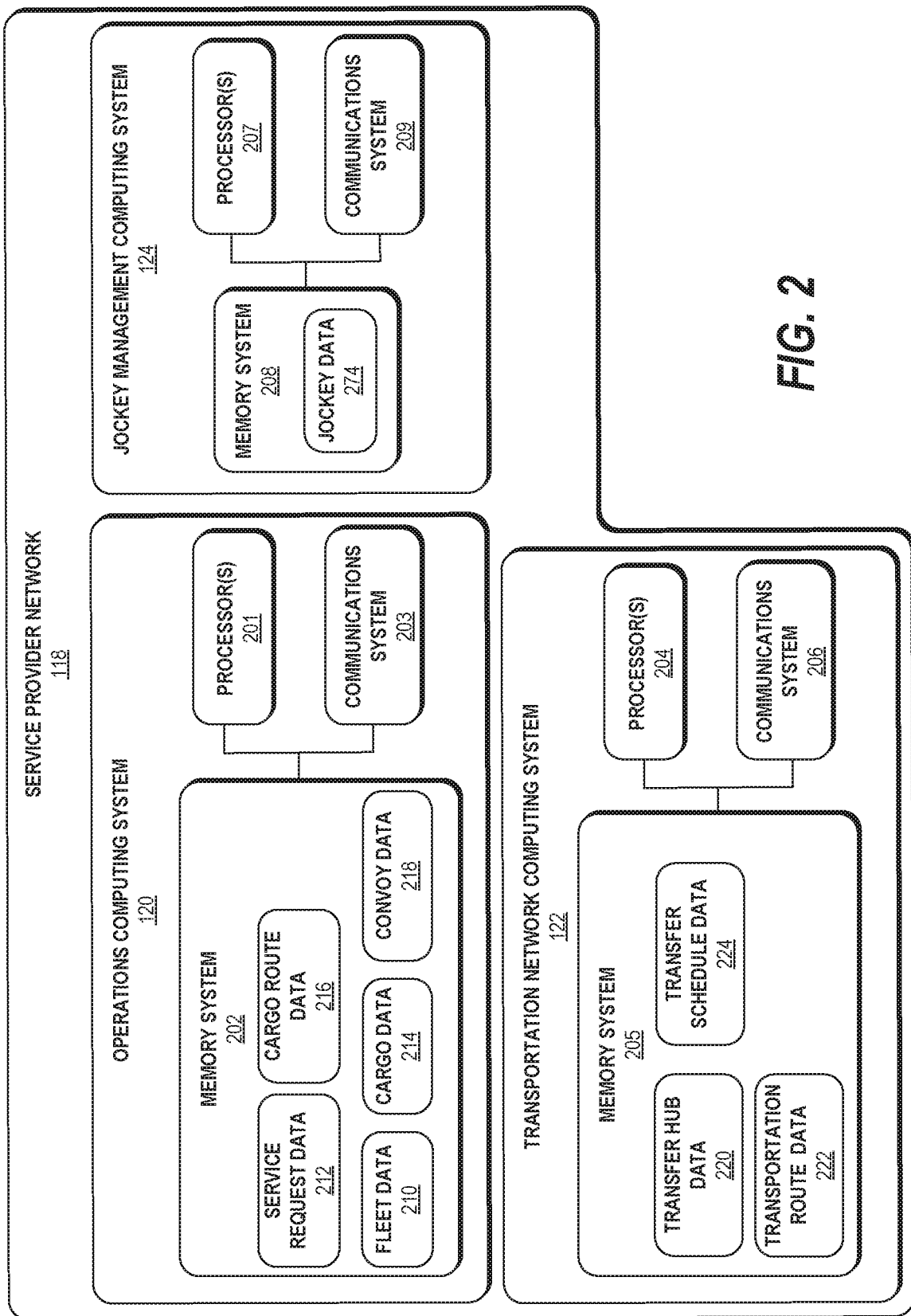
FIG. 2 depicts an example remote computing system(s) according to example embodiments of the present disclosure.

FIG. 2 illustrates a schematic view of one embodiment of the service provider network 118 described above with reference to FIG. 1. As indicated above, the service provider network 118 may generally include or be associated with one or more computing systems that allow the service provider network 118 to provide a vehicle-based service. For instance, as shown in FIG. 2, the service provider network 118 may, in one embodiment, include an operations computing system 120, a transportation network computing system 122, a jockey management computing system 124, and/or any combination of such computing systems. It should be appreciated that, although the computing systems 120, 122, 124 will generally be described separately, the various functions and/or other tasks described herein as being implemented by any of such computing systems forming part of the service provider network 118 may, instead, by performed by a single computing system of the service provider network or may be distributed across two or more computing systems of the service provider network 118.

As shown in FIG. 2, the transportation network computing system 122 associated with the service provider network 118 can include one or more processors 204, a memory system 205, and a communications system 206. The memory system 205 can include transfer hub data 220, transportation route data 222, and a transfer schedule data 224 associated with a transportation network that is used to provide a vehicle-based service. The operations computing system 120 can communicate with the transportation network computing system 122 to obtain data indicative of the transportation network to provide the vehicle-based service.

The transfer hub data 220 can include information about one or more transfer hubs in the transportation network and one or more attributes associated with each transfer hub. The attribute(s) associated with each transfer hub can include, for example, a transfer hub identifier associated with the transfer hub and a plurality of locations associated with the transfer hub (e.g., landing zone(s), dropyard(s), launch zone(s)). Additionally, the transfer hub data 220 can include information about one or more attributes associated with each of the plurality of locations. The attribute(s) associated with each location can include, for example, a total capacity, available capacity, capacity threshold, geographic coordinates, and other characteristics or facilities associated with the location.

The total capacity associated with a location can correspond to a maximum number of asset(s) that can be located at the location at a single time. The total capacity can be based on a physical space corresponding to the location and/or a physical space used by each asset. The total capacity can also be based on, for example, a minimum distance to keep between the asset(s) at the location, safety barriers, obstructions, or other objects occupying the location.

The available capacity associated with a location at a particular time can correspond to a difference between a total capacity associated with the location and an amount of the total capacity being used at the particular time. The available capacity associated with the location can vary during a particular duration of time based on a number of assets arriving at the location and a number of assets departing the location within the duration. When the operations computing system 120 directs an asset to be moved to the location or directs an asset to be moved away from the location, the operations computing system 120 can communicate information about the move to the transportation network computing system 122. The transportation network computing system 122 can update the available capacity associated with the location based on the information received from the operations computing system 120.

The capacity threshold associated with a location can be used to determine when to move one or more assets from the location to another location. The capacity threshold can be equal to or less than the total capacity associated with the location. For example, the operations computing system 120 can direct a jockey to move one or more assets from a landing zone within a transfer hub to one or more other locations within the transfer hub when an amount of the total capacity being used at the landing zone reaches the capacity threshold.

The geographic coordinates associated with a location can be used to determine a distance from the location to one or more other locations (e.g., by comparing the geographic coordinates of the location and the other location(s)). For example, the operations computing system 120 can determine a distance between a first location within the transfer hub (e.g., landing zone, dropyard, or launch zone) and a second location within the transfer hub (e.g., landing zone, dropyard, or launch zone), between the first location and a location associated with an asset, and/or between the first location and a location associated with a jockey.

The other characteristics or facilities associated with each location can indicate, for example, whether the location is associated with being capable of holding specific cargo-types (e.g., hazardous cargo, climate-controlled cargo, etc.), and/or whether the location is associated with being capable of performing one or more maintenance/repair services (e.g., refueling service, component repair/replacement service, component update/upgrade service, etc.).

As an example, a transfer hub can include a dropyard associated with being capable of holding an asset that includes hazardous cargo. The dropyard can include characteristics or facilities specifically tailored to hold an autonomous vehicle transporting a hazardous cargo and/or the hazardous cargo itself (e.g., an isolated location, special safety equipment, etc.). Based on a determination that an autonomous vehicle transporting hazardous cargo is at a landing zone, or will be arriving at the landing zone, the operations computing system 120 can assign a jockey to move the asset from the landing zone to the dropyard associated with being capable of holding hazardous cargo. In example embodiments, the operations computing system 120 can select the dropyard dynamically and/or automatically based on the determination that the asset includes hazardous cargo.

As another example, a transfer hub can include a dropyard associated with being capable of holding an asset that includes climate-controlled cargo. The dropyard can include characteristics or facilities specifically tailored to hold an autonomous vehicle transporting a climate-controlled cargo and/or the climate-controlled cargo itself (e.g., a climate-controlled holding area, etc.). Based on a determination that an autonomous vehicle transporting climate-controlled cargo is at a landing zone, or will be arriving at the landing zone, the operations computing system 120 can assign a jockey to move the asset from the landing zone to the dropyard associated with being capable of holding climate-controlled cargo. In example embodiments, the operations computing system 120 can select the dropyard dynamically and/or automatically based on the determination that the autonomous vehicle includes climate-controlled cargo.

As another example, a transfer hub can include a dropyard associated with being capable of performing one or more maintenance/repair services. The dropyard can include characteristics or facilities specifically tailored for performing the maintenance/repair service(s) (e.g., tools, inventory, technicians, etc.). Based on a determination that an asset includes an autonomous vehicle that is in need of one or more maintenance/repair services and that the autonomous vehicle is at a landing zone, or will be arriving at the landing zone, the operations computing system 120 can assign a jockey to move the asset from the landing zone to the dropyard associated with being capable of performing the maintenance/repair service(s). In example embodiments, the operations computing system 120 can select the dropyard dynamically and/or automatically based on the determination that the autonomous vehicle is in need of the maintenance/repair service(s).

Referring still to FIG. 2, the transportation route data 222 can include information about one or more transportation routes connecting the transfer hub(s) in the transportation network and one or more attributes associated with each transportation route. The one or more attributes associated with each transportation route can include, for example, a route distance, average speed limit, traffic conditions, road conditions, weather conditions, etc.

The transfer schedule data 224 can include information associated with each transfer hub in the transportation network. The transfer schedule data 224 can include a schedule of one or more assignments for moving one or more assets from a first location (e.g., landing zone or dropyard) associated with a transfer hub to a second location (e.g., dropyard or launch zone) associated with the transfer hub. The operations computing system 120 can determine the transfer schedule data 224 based on one or more attributes associated with the asset(s) and/or an availability of a jockey for each assignment. If the asset(s) includes cargo, then the attributes associated with the asset(s) can include, for example, a cargo-type, scheduled arrival time, and/or scheduled departure time associated with the cargo. If the asset(s) includes an autonomous vehicle, then the attributes associated with the asset(s) can also include, for example, an estimated arrival time associated with the autonomous vehicle. FIG. 7 depicts an example of a transfer schedule according to example embodiments of the present disclosure, and is discussed further below.

As shown in FIG. 2, the jockey management computing system 124 of the service provider network 118 can include one or more processors 207, a memory system 208, and a communications system 209. The memory system 208 can, for instance, include jockey data 274.

The jockey data 274 can include information about one or more attributes associated with each jockey in a pool of jockeys associated with each transfer hub in the transportation network. The operations computing system 120 can communicate with the jockey management computing system 124 to obtain data indicative of the jockey(s) in order to assign a jockey to move one or more asset(s) within a transfer hub. The jockey data 274 can include, for example, a jockey identifier, transfer hub, an assignment log, a jockey location, a travel distance, a travel mode, a travel time, shift information, one or more licenses, a performance rating, and/or an assignment confirmation. The jockey management computing system 124 can communicate with one or more computing systems associated with one or more jockeys (e.g., a mobile phone associated with the jockey).

The jockey identifier associated with each jockey can indicate a unique identifier for the jockey. For example, the jockey identifier may correspond to a unique number, code, and/or other identifying information and/or data.

The transfer hub associated with each jockey can indicate a transfer hub associated with the jockey. The jockey can be assigned to move one or more asset(s) between locations associated the transfer hub.

The assignment log associated with each jockey can indicate one or more assignments that are assigned to the jockey. In one embodiment, the assignment log can indicate one or more assignments that were assigned to the jockey and completed, and/or one or more assignments that are assigned to the jockey and are currently pending (e.g., one or more assignments that are to be completed at a current time and/or one or more future times). Each assignment in the assignment log can include, for instance, an identifier corresponding to an asset(s) to be moved, a first location from which the asset(s) is to be moved, a second location to which the asset(s) is to be moved, a scheduled time when the asset(s) is to be moved from the first location to the second location, and/or an estimated duration. The estimated duration can indicate an estimated amount of time for moving the asset(s) from the first location to the second location.

The jockey location associated with each jockey can indicate a location of the jockey at a current time and/or a future time. As an example, if a jockey is disposed at a first location within a transfer hub at a current time, then a jockey location associated with the jockey at the current time can indicate the first location. If the jockey will be disposed or is expected to be disposed at a second location within the transfer hub at a future time, then a jockey location associated with the jockey at the future time can indicate the second location.

The travel distance associated with each jockey can indicate a distance that the jockey will travel to arrive at a location of an asset associated with an assignment. As a first example, if a jockey is at a first location and the service provider network assigns the jockey a first assignment to move an asset from the first location to a second location, then a travel distance associated with the jockey for the first assignment can indicate a negligible distance because the jockey is already at the first location. As a second example, if a jockey is at a first location and the service provider network assigns the jockey a first assignment to move an asset from a second location to a third location, then a travel distance associated with the jockey for the first assignment can indicate a distance between the first location and the second location. As a third example, if a jockey is at a first location and the service provider network assigns the jockey a first assignment to move an asset from the first location to a second location and a second assignment to move an asset from the second location to a third location, then a travel distance associated with the jockey for the first assignment can indicate a negligible distance because the jockey is already at the first location and the travel distance associated with the jockey for the second assignment can indicate a negligible distance because the jockey will already be at the second location after completing the first assignment. As a fourth example, if a jockey is at a first location and the service provider network assigns the jockey a first assignment to move an asset from the first location to a second location and a second assignment to move an asset from a third location to a fourth location, then a travel distance associated with the jockey for the first assignment can indicate a negligible distance because the jockey is already at the first location and a travel distance associated with the jockey for the second assignment can indicate a distance between the second location and the third location.

The travel mode associated with each jockey can indicate one or more modes of travel that the jockey can use to arrive at a location of an asset associated with an assignment. A mode of travel can include, for example, a walking mode, a support vehicle mode, or other mode. As an example, the service provider network can assign a jockey a first assignment to move an asset from a first location to a second location. If the jockey can arrive at the first location by walking to the first location, then a travel mode associated with the jockey for the first assignment can indicate a walking mode. If the jockey can arrive at the first location by operating a support vehicle, then a travel mode associated with the jockey for the first assignment can indicate a support vehicle mode. If the jockey can arrive at the first location by another mode, then a travel mode associated with the jockey for the first assignment can indicate such other mode.

The travel time associated with each jockey can indicate an amount of time for the jockey to arrive at a location of an asset associated with an assignment. As a first example, if a jockey is at a first location and the service provider network assigns the jockey a first assignment to move an asset from the first location to a second location, then a travel time associated with the jockey for the first assignment can indicate a negligible amount of time because the jockey is already at the first location. As a second example, if a jockey is at a first location and the service provider network assigns the jockey a first assignment to move an asset from a second location to a third location, then a travel time associated with the jockey for the first assignment can indicate an amount of time for the jockey to travel from the first location to the second location. As a third example, if a jockey is at a first location and the service provider network assigns the jockey a first assignment to move an asset from the first location to a second location and a second assignment to move an asset from the second location to a third location, then a travel time associated with the jockey for the first assignment can indicate a negligible amount of time because the jockey is already at the first location and the travel time associated with the jockey for the second assignment can indicate a negligible amount of time because the jockey will already be at the second location after completing the first assignment. As a fourth example, if a jockey is at a first location and the service provider network assigns the jockey a first assignment to move an asset from the first location to a second location and a second assignment to move an asset from a third location to a fourth location, then a travel time associated with the jockey for the first assignment can indicate a negligible amount of time because the jockey is already at the first location and a travel time associated with the jockey for the second assignment can indicate an amount of time for the jockey to travel from the second location to the third location. It should be appreciated that the travel time associated with a given assignment may vary, for example, based on the corresponding travel mode of the jockey (e.g., walking vs. driving).

The shift information associated with each jockey can indicate one or more shift start times and one or more shift end times during which the jockey is available to work. A shift start time associated with the jockey can indicate a time when the jockey becomes available for an assignment. A shift end time associated with the jockey can indicate a time when the jockey becomes unavailable for an assignment.

The license(s) associated with each jockey can indicate whether the jockey is qualified for an assignment. For example, a jockey can be required to obtain one or more licenses to manually operate a vehicle, remotely operate a vehicle, operate a commercial vehicle, operate a vehicle transporting certain types of cargo (e.g., hazardous materials and other hazardous cargo), etc.

The performance rating associated with each jockey can indicate an aggregate rating associated with the jockey based on a performance of the jockey with respect to one or more completed assignments.

The assignment confirmation associated with each jockey can indicate whether the jockey has confirmed acceptance of an assignment. For example, the service provider network can send a jockey an assignment request associated with a new assignment. The assignment request can include an identifier corresponding to an asset(s) to be moved, a first location from which the asset(s) is to be moved, a second location to which the asset(s) is to be moved, a scheduled time at which the asset(s) is to be moved, an estimated duration, and/or the like. The jockey can accept the new assignment by confirming the assignment request.

As shown in FIG. 2, the operations computing system 120 can include one or more processors 201, a memory system 202, and a communications system 203. The memory system 202 can, for instance, include fleet data 210, service request data 212, cargo data 214, cargo route data 216, and/or convoy data 218.

The fleet data 210 can include information associated with a fleet of vehicles managed by the operations computing system 120 of the service provider network 118. For example, the fleet data 210 can include a unique identifier for the vehicle(s) 104, 105.

The service request data 212 can include information associated with one or more service requests from a client. For example, a client computing system 126 associated with the client can send data indicative of a service request to the operations computing system 120 for transporting cargo from a first location (e.g., pick-up location) to a second location (e.g., drop-off location). The data indicative of the service request can include the first location, the second location, and information associated with the cargo. The information associated with the cargo can include, for example, a cargo identifier, cargo-type, cargo weight, etc. The operations computing system 120 can store the data indicative of the service request in the service request data 212.

The cargo data 214 can include information associated with cargo designated for autonomous transport. For example, the operations computing system 120 can receive a service request from a client computing system 126 for transporting cargo. The operations computing system 120 can designate the cargo associated with the service request for autonomous transport, and store information associated with the designated cargo in the cargo data 214. The cargo data 214 can include, for example, a cargo identifier, cargo-type, cargo-weight, and/or other information associated with the cargo. The cargo identifier in the cargo data 214 can be based on a cargo identifier obtained from the client computing system 126 as part of a service request, or the operations computing system 120 can assign its own cargo identifier to the cargo in the cargo data 214.

The cargo route data 216 can include information associated with a cargo route for each cargo in the cargo data 214. The operations computing system 120 can determine a cargo route for given cargo based on a service request associated with the cargo in the service request data 212, transfer hub data 220, and/or transportation route data 222. For example, the operations computing system 120 can determine a first transfer hub in the transportation network that is proximate to the first location associated with the cargo (e.g., a pick-up location), a second transfer hub that is proximate to the second location associated with the cargo (e.g., a drop-off location), and one or more transportation routes that connect the first transfer hub to the second transfer hub. The operations computing system 120 can also determine the cargo route to include one or more transfer hubs between the first and second transfer hubs and one or more transportation routes that connect the first transfer hub to the second transfer hub via the transfer hub(s) between the first and second transfer hubs. The operations computing system 120 can also determine a scheduled arrival time and a scheduled departure time for the cargo at each of the transfer hubs in the cargo route. The operations computing system 120 can store the determined cargo route in the cargo route data 216.

The convoy data 218 can include information associated with one or more convoys that include one or more vehicles from the fleet of vehicles managed by the operations computing system 120. The convoy data 218 can include, for example, a convoy identifier associated with each convoy, a vehicle identifier associated with a lead vehicle in the convoy, a vehicle identifier associated with each follower vehicle in the convoy, and an escort identifier associated with an escort assigned to the convoy. The operations computing system 120 can group one or more vehicles from the fleet of vehicles to create a new convoy, and the operations computing system 120 can store information associated with the new convoy in the convoy data 218.

Figure 3:
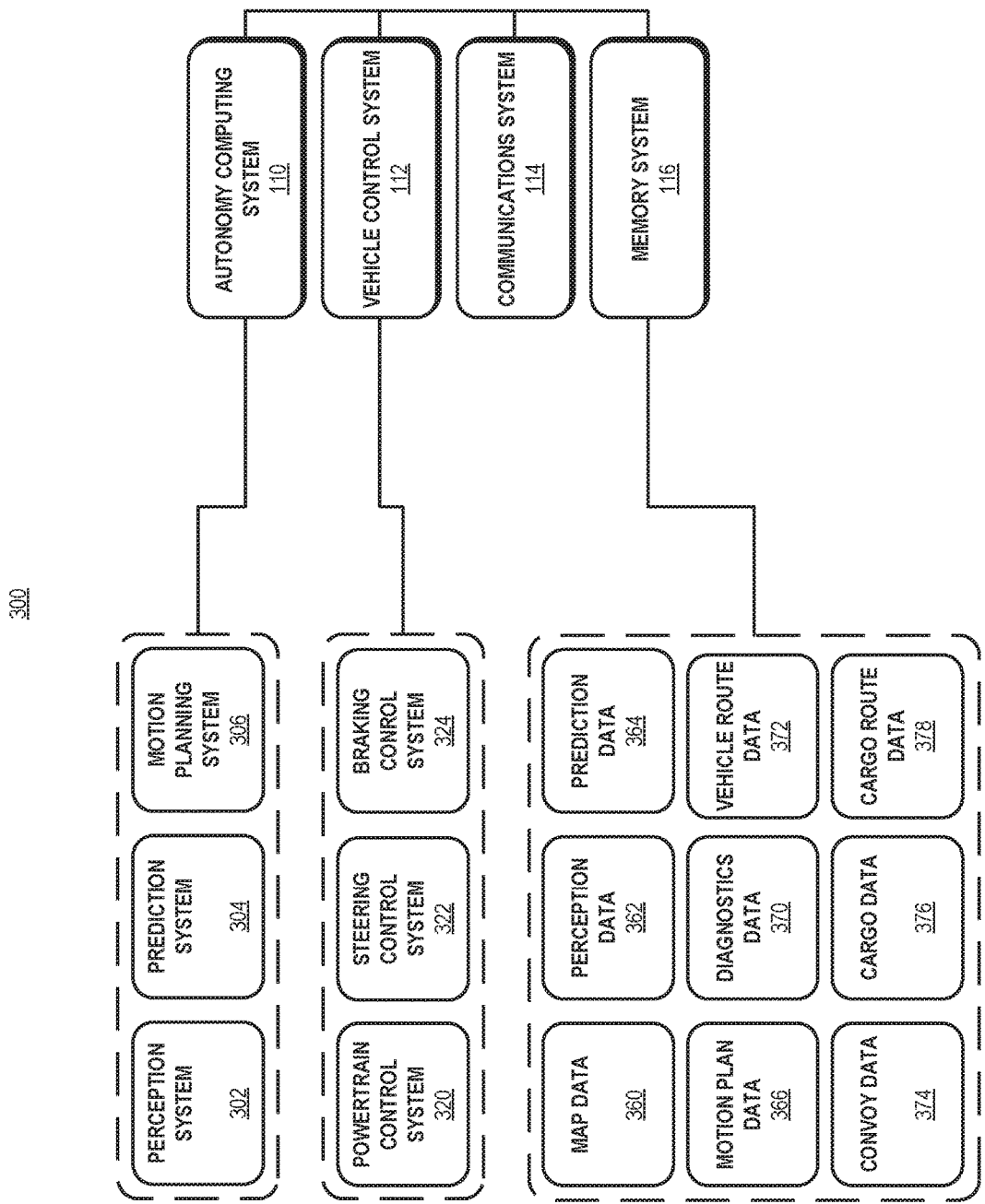
FIG. 3 depicts an example vehicle computing system according to example embodiments of the present disclosure.

Referring now to FIG. 3, a schematic view of one embodiment of the vehicle computing system 102 described above is illustrated in accordance with aspects of the present subject matter. As shown in FIG. 3, the autonomy computing system 110 can include a perception system 302, a prediction system 304, a motion planning system 306, and/or other systems that cooperate to perceive the surrounding environment of the vehicle 104 and determine a motion plan for controlling the motion of the vehicle 104 accordingly. For example, the autonomy computing system 110 can receive the sensor data 109 from the sensor(s) 108, attempt to comprehend the surrounding environment by performing various processing techniques on the sensor data 109 (and/or other data), and generate an appropriate motion plan through such surrounding environment. The autonomy computing system 110 can control the one or more vehicle control systems 112 to operate the vehicle 104 according to the motion plan.

The autonomy computing system 110 can identify one or more objects that are proximate to the vehicle 104 based at least in part on the sensor data 109 and/or the map data 360. For instance, the perception system 302 can perform various processing techniques on the sensor data 109 to determine perception data 362 that is descriptive of a current state of one or more object(s) that are proximate to the vehicle 104. The prediction system 304 can create prediction data 364 associated with each of the respective one or more object(s) proximate to the vehicle 104. The prediction data 364 can be indicative of one or more predicted future locations of each respective object. The motion planning system 306 can determine a motion plan for the vehicle 104 based at least in part on the prediction data 364 (and/or other data), and save the motion plan as motion plan data 366. The motion plan data 366 can include vehicle actions with respect to the object(s) proximate to the vehicle 104 as well as the predicted movements. The motion plan data 366 can include a planned trajectory, speed, acceleration, etc. of the vehicle 104.

The motion planning system 306 can provide at least a portion of the motion plan data 366 that indicates one or more vehicle actions, a planned trajectory, and/or other operating parameters to the vehicle control system 112 to implement the motion plan for the vehicle 104. For instance, the vehicle 104 can include a mobility controller configured to translate the motion plan data 366 into instructions. By way of example, the mobility controller can translate the motion plan data 366 into instructions to adjust the steering of the vehicle 104 "X" degrees, apply a certain magnitude of braking force, etc. The mobility controller can send one or more control signals to the responsible vehicle control sub-system (e.g., powertrain control system 320, steering control system 322, braking control system 324) to execute the instructions and implement the motion plan.

The communications system 114 can allow the vehicle computing system 102 (and its computing system(s)) to communicate with one or more other computing systems (e.g., remote computing system(s) 103, vehicle(s) 105). The vehicle computing system 102 can use the communications system 114 to communicate with the service provider network 118 (including, for example, the operations computing system 120, the transportation network computing system 122, and/or the jockey management computing system 124) and/or any other suitable remote computing system(s) (e.g., client computing system 126) over one or more networks (e.g., via one or more wireless signal connections). In some implementations, the communications system 114 can allow communication among one or more of the system(s) onboard the vehicle 104. The communications system 114 can include any suitable sub-systems for interfacing with one or more networks, including, for example, transmitters, receivers, ports, controllers, antennas, and/or other suitable subsystems that can help facilitate communication.

The memory system 116 of the vehicle 104 can include one or more memory devices located at the same or different locations (e.g., on-board the vehicle 104, distributed throughout the vehicle 104, off-board the vehicle 104, etc.). The vehicle computing system 102 can use the memory system 116 to store and retrieve data/information. For instance, the memory system 116 can store map data 360, perception data 362, prediction data 364, motion plan data 366, diagnostics data 370, vehicle route data 372, convoy data 374, cargo data 376, and cargo route data 378.

The map data 360 can include information regarding: an identity and location of different roadways, road segments, buildings, or other items or objects (e.g., lampposts, crosswalks, curbing, etc.); a location and direction of traffic lanes (e.g., the location and direction of a parking lane, a turning lane, a bicycle lane, or other lanes within a particular roadway or other travel way and/or one or more boundary markings associated therewith); and/or any other data that assists the vehicle computing system 102 in comprehending and perceiving its surrounding environment and its relationship thereto.

The diagnostics data 370 can include diagnostics information generated by the vehicle computing system 102. The diagnostics information can correspond to one or more systems on-board the vehicle 104 and/or an environment in which the vehicle 104 operates. The diagnostics information can include raw sensor data associated with the one or more systems on-board the vehicle 104 and/or the environment in which the vehicle 104 operates. The vehicle computing system 102 (or remote computing system(s) 103) can use the diagnostics information to determine an operational status associated with the vehicle 104. The vehicle computing system 102 can optionally store the determined operational status with the diagnostics data 370.

As an example, the diagnostics information can include a fuel level below a threshold value. Based on the diagnostics information, the vehicle computing system 102 can determine an operational status of the vehicle as in need of a refueling service.

As another example, the diagnostics information can include an amount of wear/fatigue associated with one or more components on-board the vehicle 104. Based on the diagnostics information, the vehicle computing system 102 can determine an operational status of the vehicle 104 as in need of a component repair/replacement service.

As another example, the vehicle computing system 102 can determine an operational status of the vehicle 104 as in need of a diagnostics check service for a human operator (e.g., mechanic, technician, etc.) to check the diagnostics information.

The cargo data 376 can include information associated with cargo being transported by the vehicle 104. The cargo data 376 can indicate whether a trailer containing cargo is hitched to the vehicle 104. The trailer can include a plurality of cargo, and the cargo data 376 can include information associated with each cargo included in the trailer. The information associated with each cargo can include, for example, a cargo identifier, cargo-type, cargo-weight, and/or other information associated with the cargo. The vehicle computing system 102 can obtain the cargo data 376 from the operations computing system 120 based on the cargo data 214.

The cargo route data 378 can include information associated with a cargo route for each cargo in the cargo data 376. The cargo data 376 can include, for example, a first location (e.g., pick-up location), a second location (e.g., drop-off location), a plurality of transfer hubs in the transportation network, and a plurality of transportation routes connecting the first location to the second location via the plurality of transfer hubs. The vehicle computing system 102 can obtain the cargo route data 378 from the operations computing system 120 based on the cargo route data 216. FIG. 6 depicts an example of a cargo route according to example embodiments of the present disclosure, and is discussed further below.

The vehicle route data 372 can include information associated with a vehicle route for the vehicle 104. The vehicle route data 372 can include a vehicle location, a current destination, and one or more transportation routes connecting the vehicle location to the current destination. The vehicle location can indicate a geographic location of the vehicle 104 at a current time. If the vehicle 104 is transporting cargo, then the current destination and the transportation route(s) connecting the vehicle location to the current destination can be based on the cargo route data 378. For example, if the cargo route includes a first transfer hub followed by a second transfer hub and the vehicle computing system 102 determines that the vehicle 104 has departed the first transfer hub, then the vehicle computing system 102 can determine that the current destination is the second transfer hub.

The vehicle route data 372 can also include, for example, a vehicle speed, an estimated arrival time, and a next destination.

The vehicle speed can indicate a current speed of the vehicle 104. The vehicle computing system 102 can determine the travel speed based on, for example, a speed sensor onboard the vehicle 104.

The estimated arrival time can indicate an amount of time for the vehicle 104 to reach the current destination. The vehicle computing system 102 can determine the estimated arrival time based on the vehicle location and vehicle speed in the vehicle route data 372. The vehicle computing system 102 can also obtain the transportation route data 222 and determine the estimated arrival time based on one or more attributes (e.g., average speed limit, traffic conditions, road conditions, weather conditions, etc.) associated with the transportation route(s) in the vehicle route data 372.

The next destination can indicate a destination of the vehicle 104 after the current destination. The next destination can be based on a cargo route in the cargo route data 378. For example, if the cargo route includes a first transfer hub followed by a second transfer hub and the vehicle computing system 102 determines that the current destination is the first transfer hub, then the vehicle computing system 102 can determine that the next destination is the second transfer hub.

The convoy data 374 can include information associated with a convoy that includes the vehicle 104. The convoy data 374 can indicate whether the vehicle 104 is part of a convoy. If the vehicle 104 is part of a convoy, the convoy data 374 can include, for example, a convoy identifier associated with the convoy, a vehicle identifier associated with a lead vehicle in the convoy, and an escort identifier associated with an escort assigned to the convoy. The vehicle computing system 102 can obtain the convoy data 374 from the operations computing system 120 based on the convoy data 218.

Figure 4:
FIG. 4 depicts an example transportation network according to example embodiments of the present disclosure.

FIG. 4 depicts a diagram of an example transportation network 400 according to example embodiments of the present disclosure. The transportation network 400 can include transfer hubs 410, 412, 414, 416, 418 and 420. The transportation network 400 can include a plurality of locations 470, 471, 472, and 473 that are proximate to a transfer hub 410 (e.g., a first transfer hub), and a plurality of locations 480, 481, 482 that are proximate to a transfer hub 420 (e.g., a second transfer hub). The plurality of locations 470-473 and 480-482 can be connected to each other and to a proximate transfer hub via one or more local routes. For example, the location 470 can be connected to the transfer hub 410 via local route 491, and the location 480 can be connected to the transfer hub 420 via local route 392. The transportation network 400 can include a plurality of locations (not shown) that are proximate to each of the transfer hubs 412, 414, 416, 418 and that are connected to each other and to a proximate transfer hub via one or more local routes (not shown).

The transfer hubs 410, 412, 414, 416, 418 and 420 in the transportation network 400 can be connected to each other via one or more of the transportation routes 431, 432, 433, 434, 435, 436, 437, 438, 439, 440, 441, 442, 443, 444, 445, 446, 447, 448, 449, 450, 451, and 452. For example, transfer hub 410 is connected to transfer hub 414 via transportation route 433, and transfer hub 414 is connected to transfer hub 410 via transportation route 434. As another example, transfer hub 414 is connected to transfer hub 420 via transportation routes 435, 437, and 439, or via transportation routes 451, 445, 449, and 442. In this way, an asset that includes an autonomous vehicle transporting cargo can travel from a first transfer hub to a second transfer hub in the transportation network 400 via a variety of different transportation route combinations.

In an example embodiment, a client can contract to transport cargo from a location 470 to location 480. A driver associated with the client can operate a vehicle to pick-up the cargo from the location 470 and transport the cargo to transfer hub 410 via local route 491. The operations computing system 120 can control vehicle 104 to autonomously transport the cargo from transfer hub 410 to reach transfer hub 420 that is proximate to the location 480.

The operations computing system 120 can control vehicle 104 to transport the cargo, for example, via transportation routes 433, 435, 437, and 439. The operations computing system 120 can control the vehicle 104 to transport the cargo via the transfer hubs 414 and/or 418 by controlling the vehicle 104 to stop at a landing zone associated with the transfer hubs 414 and/or 418 along the way, or the operations computing system 120 can control the vehicle 104 to travel directly from the transfer hub 410 to the transfer hub 420. When the cargo arrives at the transfer hub 420, another driver associated with the client can operate a vehicle to transport the cargo from the transfer hub 420 to the location 481 via local route 492.

Figure 5:
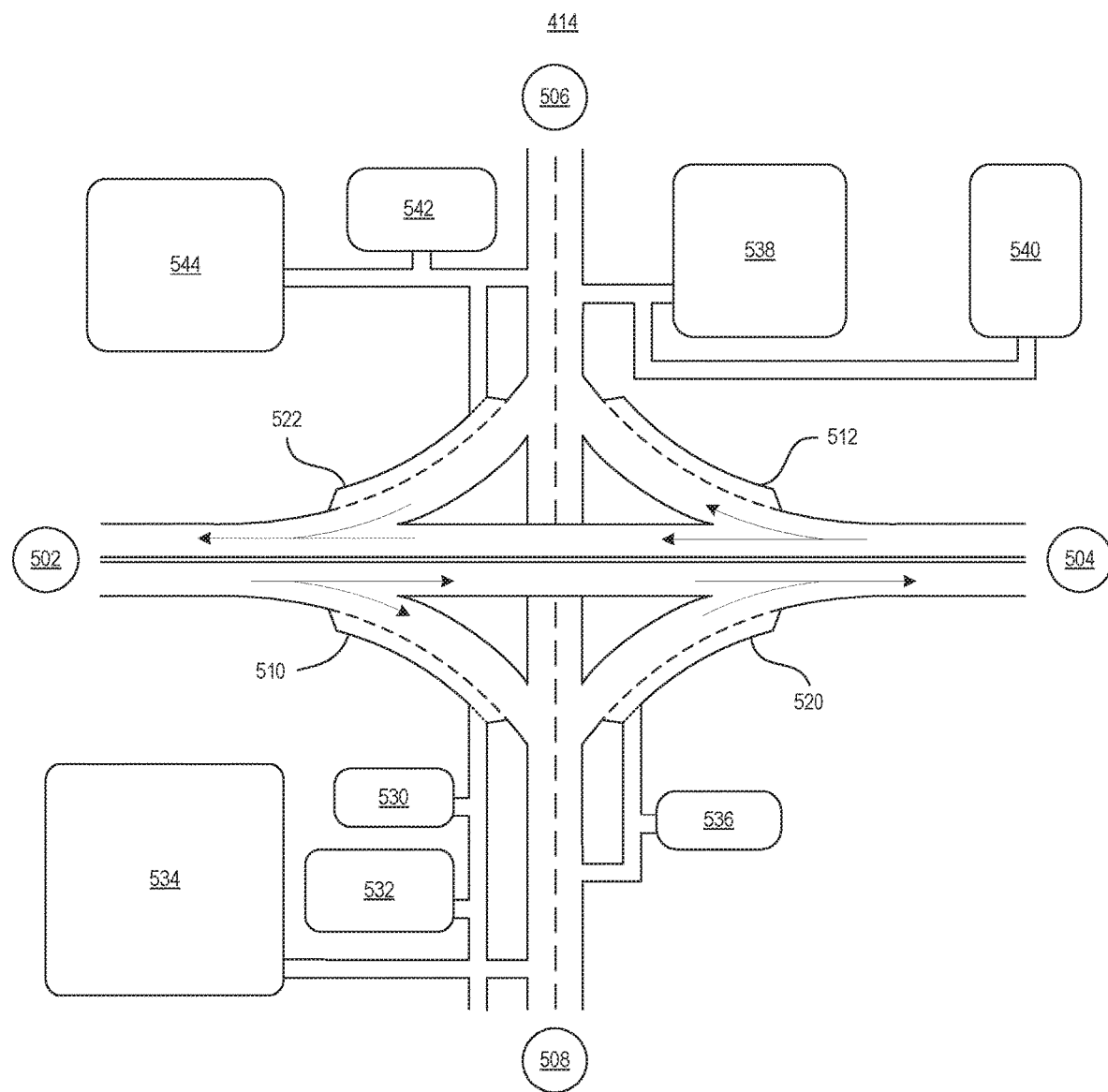
FIG. 5 depicts an example transfer hub according to example embodiments of the present disclosure.

FIG. 5 depicts a diagram of the transfer hub 414 in the transportation network 400 according to example embodiments of the present disclosure. The transfer hub 414 can be proximate to a highway road connecting a location 502 with another location 504. The transfer hub 414 can also be proximate to a local road connecting a location 506 with another location 508. The locations 502, 504, 506 and 508 can correspond to another transfer hub in the transportation network, or any other location (e.g., pick-up location, drop-off location, geographic location, etc.).

The transfer hub 414 can include landing zones 510 and 512. The landing zone 510 can be a location for receiving one or more assets (e.g., vehicle 104 and/or vehicle(s) 105) that arrive at the transfer hub 414 from location 502, and the landing zone 512 can be a location for receiving one or more assets that arrive at the transfer hub 414 from location 504. The transportation network computing system 122 of the service provider network 118 can include data indicative of a capacity, available capacity, capacity threshold, geographic coordinates, characteristics, facilities, and/or other attributes associated with each of the landing zones 510 and 512.

The transfer hub 414 can include launch zones 520 and 522. The launch zone 520 can be a location from which one or more assets (e.g., vehicle 104 and/or vehicle(s) 105) can depart the transfer hub 414 toward location 504, and the launch zone 522 can be a location from which the autonomous vehicle(s) can depart the transfer hub 414 toward location 502. The transportation network computing system 122 can include data indicative of a capacity, available capacity, capacity threshold, geographic coordinates, characteristics, facilities, and/or other attributes associated with each of the launch zones 510 and 512.

The transfer hub 414 can include dropyards 530, 532, 534, 536, 538, 540, 542 and 544. The dropyards can be a location for holding one or more assets (e.g., autonomous vehicle(s) and/or cargo) that are located at the transfer hub 414. The asset(s) can include autonomous vehicle(s) (e.g., vehicle 104 and/or vehicle(s) 105) that arrive at the transfer hub 414 from location 502 or 504, and/or cargo being transported by the autonomous vehicle(s). The dropyards 530, 532, 534, 536, 538, 540, 542 and 544 can be associated with one or more attributes, such as, for example, a capacity, available capacity, capacity threshold, geographic coordinates, and characteristics, facilities. The transportation network computing system 122 can include data indicative of the capacity, available capacity, capacity threshold, geographic coordinates, characteristics, facilities, and/or other attributes associated with each of the dropyards 530, 532, 534, 536, 538, 540, 542 and 544.

In an example embodiment, the vehicle 104 can transport cargo and arrive at the landing zone 510 with the cargo. The operations computing system 120 can assign a jockey to move the vehicle 104 and its cargo from the landing zone 510 to the dropyard 530. The jockey can manually operate the vehicle 104 at the landing zone 510 and maneuver the vehicle 104 to the dropyard 530. Alternatively, the jockey can remotely operate the vehicle 104 to maneuver the vehicle 104 from the landing zone 510 to the dropyard 530. Alternatively, the jockey can operate a support vehicle at the landing zone 510 and the service provider can configure the support vehicle as a lead vehicle in a convoy and configure the vehicle 104 as a follower vehicle in the convoy. The jockey can maneuver the support vehicle from the landing zone 510 to the dropyard 530 and the vehicle 104 can follow the support vehicle from the landing zone 510 to the dropyard 530. In this way, the jockey can move the vehicle 104 and its cargo from the landing zone 510 to the dropyard 530.

In another example embodiment, the vehicle 104 can arrive at the landing zone 510 without any cargo. The operations computing system 120 can assign a jockey to move the vehicle 104 from the landing zone 510 to the dropyard 530. The jockey can manually operate the vehicle 104 at the landing zone 510 and maneuver the vehicle 104 to the dropyard 530. Alternatively, the jockey can remotely operate the vehicle 104 to maneuver the vehicle 104 from the landing zone 510 to the dropyard 530. Alternatively, the jockey can operate a support vehicle at the landing zone 510 and the service provider can configure the support vehicle as a lead vehicle in a convoy and configure the vehicle 104 as a follower vehicle in the convoy. The jockey can maneuver the support vehicle from the landing zone 510 to the dropyard 530 and the vehicle 104 can follow the support vehicle from the landing zone 510 to the dropyard 530. In this way, the jockey can move the vehicle 104 from the landing zone 510 to the dropyard 530.

In another example embodiment, a driver associated with a client can operate a vehicle to transport cargo from a pick-up location to the dropyard 534. The operations computing system 120 can assign a jockey to move the cargo from the dropyard 534 to dropyard 536. The jockey can operate a support vehicle at the dropyard 534 and hitch a trailer containing the cargo to the support vehicle. The jockey can maneuver the support vehicle from dropyard 534 to dropyard 536.

In another example embodiment, a driver associated with a client can operate a vehicle to transport cargo from a pick-up location to dropyard 534. The operations computing system 120 can direct a trailer containing the cargo to be hitched to the vehicle 104 at the dropyard 534 and assign a jockey to move the vehicle 104 from the dropyard 534 to the launch zone 520. The jockey can operate the vehicle 104 at the dropyard 534 and maneuver the vehicle 104 to the launch zone 520. The operations computing system 120 can control the vehicle 104 to autonomously transport the cargo from the launch zone 520 to the location 504.

In another example embodiment, the operations computing system 120 can determine an assignment to move an asset including the vehicle 104 and cargo being transported by the vehicle 104 from the landing zone 510 to the dropyard 530 at a first time. The operations computing system 120 can obtain transfer hub data 220 from the transportation network computing system 122 to determine a geographic location associated with landing zone 510. The operations computing system 120 can obtain jockey data 274 from the jockey management computing system 124 to determine a jockey location associated with a first jockey at the first time. If the jockey location associated with the first jockey at the first time is the landing zone 510, then the operations computing system 120 can determine that the first jockey is available for the assignment.

Additionally, or alternatively, the operations computing system 120 can determine a travel distance associated with the first jockey based on a distance between the jockey location and the landing zone 510, and determine a threshold distance associated with the first jockey based on a travel mode associated with the first jockey and/or a travel time associated with the first jockey based on the jockey data 274. If the travel distance is less than the threshold distance, then the operations computing system 120 can determine that the first jockey is available for the assignment.

Additionally, or alternatively, the operations computing system 120 can determine a travel time and a threshold time associated with the first jockey for the assignment based on the jockey data 274. The operations computing system 120 can determine an estimated duration associated with the assignment based on the transfer hub data 220. If the travel time associated with the first jockey plus the estimated duration associated with the assignment is less than the threshold time, then the operations computing system 120 can determine that the first jockey is available for the assignment.

Additionally, or alternatively, the operations computing system 120 can determine a shift start time and a shift end time associated with the first jockey based on the jockey data 274. If the first time is after the shift start time and before the shift end time, and the first time plus the estimated duration associated with the assignment is before the shift end time, then the operations computing system 120 can determine that the first jockey is available for the assignment.

Additionally, or alternatively, the operations computing system 120 can obtain cargo data 376 from the vehicle 104 to determine one or more licenses required for moving the asset, and determine one or more licenses associated with the first jockey based on the jockey data 274. If the first jockey is associated with the one or more licenses required for moving the asset, then the operations computing system 120 can determine that the first jockey is available for the assignment.

Additionally, or alternatively, the operations computing system 120 can determine a performance rating associated with the assignment, and determine a performance rating associated with the first jockey based on the jockey data 274. If the performance rating associated with the first jockey is equal to or greater than the performance rating associated with the assignment, then the operations computing system 120 can determine that the first jockey is available for the assignment.

Additionally, or alternatively, the operations computing system 120 can send the first jockey an assignment request associated with the assignment. If the operations computing system 120 receives an assignment confirmation from the first jockey, then the operations computing system 120 can determine that the first jockey is available for the assignment.

In this way, the operations computing system 120 can determine one or more jockeys that are available for a given assignment from a pool of jockeys associated with the transfer hub 414, and assign one of the available jockeys to move the asset.

In another example embodiment, the operations computing system 120 can determine a first assignment to move an asset from the landing zone 510 to the dropyard 530 at a first time, and a second assignment to move the asset from the landing zone 510 to the dropyard 532 at the first time. The operations computing system 120 can obtain the jockey data 274 from the jockey management computing system 124 to determine if there is an available jockey from a pool of jockeys associated with the transfer hub 414 for the first assignment, and to determine if there is an available jockey from the pool of jockeys associated with the transfer hub 500 for the second assignment. If a first jockey from the pool of jockeys is available for the first assignment but is not available for the second assignment, then the operations computing system 120 can assign the first jockey to move the asset to the dropyard 530 and the operations computing system 120 can discard the second assignment. If the first jockey is available for the second assignment but is not available for the first assignment, then the operations computing system 120 can assign the first jockey to move the asset to the dropyard 532 and the operations computing system 120 can discard the first assignment.

In another example embodiment, the operations computing system 120 can determine a first assignment to move an asset from the landing zone 510 to the dropyard 530 at a first time, and a second assignment to move the asset from the landing zone 510 to the dropyard 530 at a second time. The operations computing system 120 can obtain the jockey data 274 from the jockey management computing system 124 to determine if there is an available jockey from a pool of jockeys associated with the transfer hub 414 for the first assignment, and to determine if there is an available jockey from the pool of jockeys associated with the transfer hub 500 for the second assignment. If a first jockey from the pool of jockeys is available for the first assignment but is not available for the second assignment, then the operations computing system 120 can assign the first jockey to move the asset to the dropyard 530 and the operations computing system 120 can discard the second assignment. If the first jockey is available for the second assignment but is not available for the first assignment, then the operations computing system 120 can assign the first jockey to move the asset to the dropyard 532 and the operations computing system 120 can discard the first assignment.

In another example embodiment, the operations computing system 120 can determine an assignment to move an asset from the landing zone 510 to the dropyard 530. The operations computing system 120 can obtain the jockey data 274 from jockey management computing system 124 to determine one or more available times when a first jockey from a pool of jockeys associated with the transfer hub 414 is available for the assignment. The operations computing system 120 can assign the first jockey to move the asset at one of the available times.

FIG. 6 depicts an example of a cargo route 600 associated with cargo being transported using the transportation network 400 described above with reference to FIG. 4, according to example embodiments of the present disclosure. The cargo route 600 can be associated with a first cargo (C1). The cargo route 600 includes transporting the first cargo from location 470 to transfer hub 410 via local route 491, transporting the first cargo from transfer hub 410 to transfer hub 414 via transportation route 433, transporting the first cargo from transfer hub 414 t to transfer hub 418 via transportation routes 435 and 437, transporting the first cargo from transfer hub 418 to transfer hub 420 via transportation route 439, and transporting the first cargo from transfer hub 420 to location 480 via local route 492.

The cargo route 600 also includes a scheduled departure time associated with location 470 (T0) and transfer hubs 410 (T2), 414 (T6), 418 (T8), 420 (T10); and a scheduled arrival time associated with location 480 (T11) and transfer hubs 410 (T1), 414 (T3), 418 (T7), 420 (T9).

The operations computing system 120 can determine the cargo route 600. For example, the operations computing system 120 can receive data indicative of a service request from the client computing system 126. The service request can include the location 470 as a first location associated with the first cargo (e.g., pick-up location) and the location 480 as a second location associated with the first cargo (e.g., drop-off location). The operations computing system 120 can determine that transfer hub 410 is proximate to the location 470 and that transfer hub 420 is proximate to the location 480, based on transfer hub data 220 from the transportation network computing system 122. The operations computing system 120 can determine the cargo route 600 from transfer hub 410 to transfer hub 420 via transfer hubs 414 and 418. The operations computing system 120 can determine the transportation routes 433, 435, 437, and 439 connecting the transfer hubs 410, 414, 418, and 420 based on transportation route data 222 from the transportation network computing system 122.

FIG. 7 depicts an example of a transfer schedule 700 associated with transfer hub 414 in the transportation network 400, according to example embodiments of the present disclosure. The transfer schedule 700 includes a plurality of assignments for moving one or more assets from a starting location (e.g., first location associated with the transfer hub 414) to an ending location (e.g., second location associated with transfer hub 414) at a scheduled time, and a jockey identifier associated with a jockey that is assigned to each assignment. A scheduled time associated with one or more assets can indicate an arrival time associated with the asset(s) that is equal to or before the scheduled time. For example, the scheduled time T1 associated with moving one or more second assets (A2) can indicate an arrival time associated with the second asset(s) that is equal to or before time T1.

In particular, the transfer schedule 700 includes an assignment for moving one or more first assets (A1) at time T3. The first asset(s) can include the first cargo (C1) discussed above with respect to FIG. 6. The first asset(s) (that includes the first cargo) can arrive at the landing zone 510 associated with the transfer hub 414 at time T3, and the operations computing system 120 can direct a jockey (J5) to move the first asset(s) from the landing zone 510 to the dropyard 530 when the first asset(s) arrive at time T3. The transfer schedule 700 includes an assignment for a jockey (J6) to move the first asset(s) from the dropyard 530 to the launch zone 520 at time T6. The first asset(s) (that includes the first cargo) can depart the transfer hub 414 from the launch zone 520 at time T6 toward transfer hub 418.

The transfer schedule 700 also includes an assignment for a jockey (J4) to move one or more seventh assets (A7) and one or more eight assets (A8) from the landing zone 512 to the dropyard 542. The operations computing system 120 can group the seventh asset(s) and the eighth asset(s) at the landing zone 512 so that the jockey can move the seventh and eighth asset(s) together as a group from the landing zone 512 to the dropyard 542.

Figure 8:
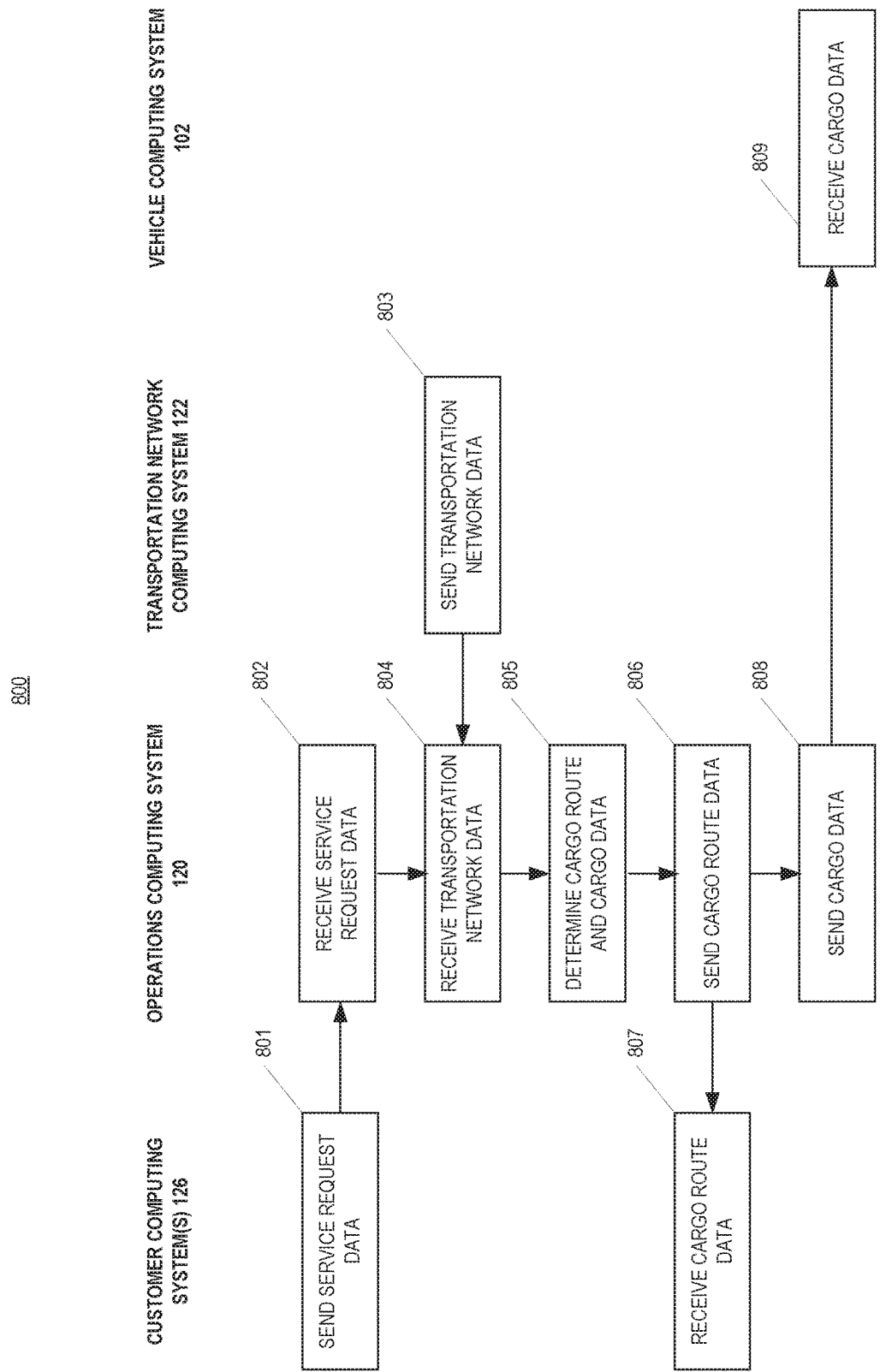
FIG. 8 depicts an example flow diagram for providing a vehicle-based service according to example embodiments of the present disclosure.
Figure 9:
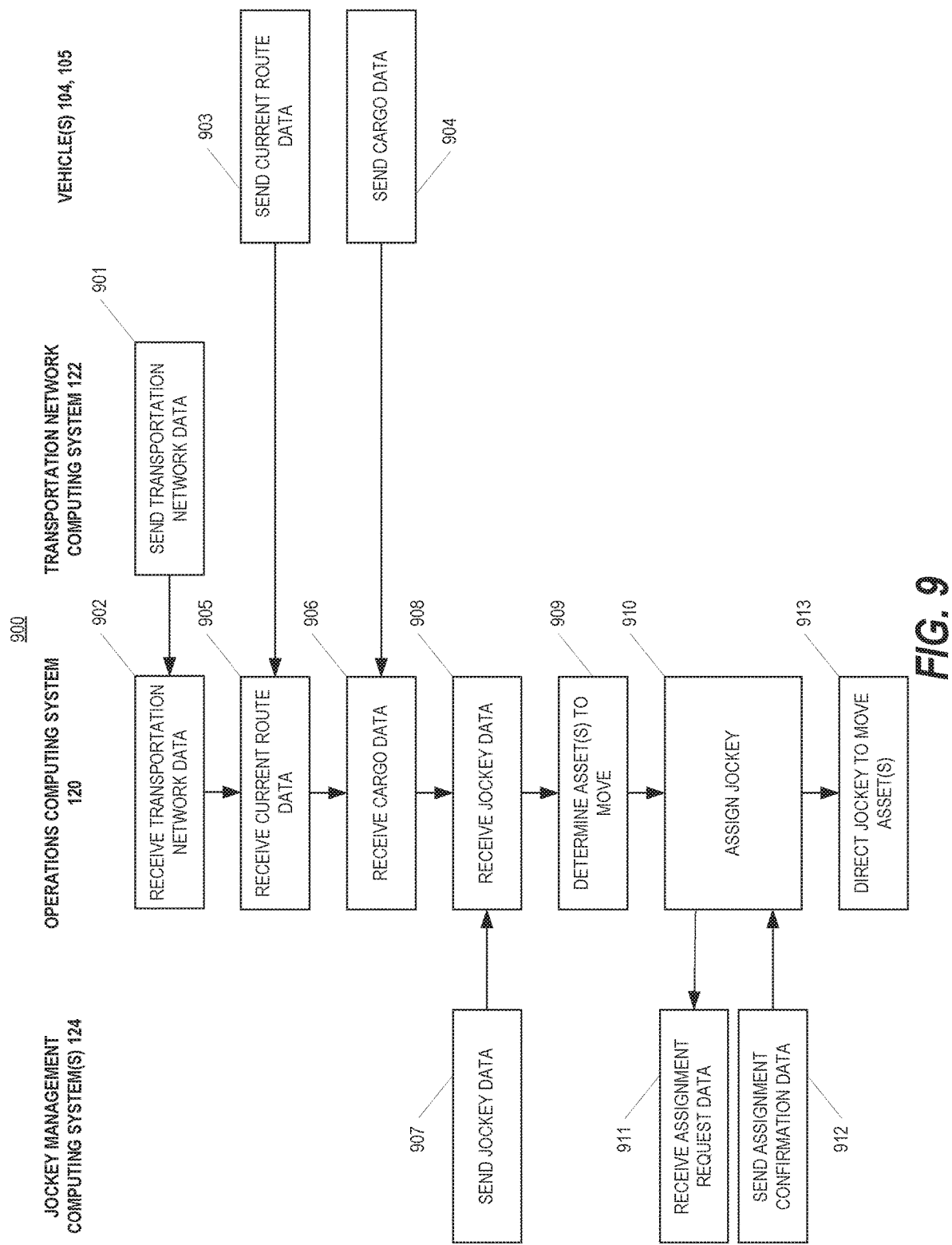
FIG. 9 depicts an example flow diagram for transferring assets within a transfer hub according to example embodiments of the present disclosure.
Figure 10:
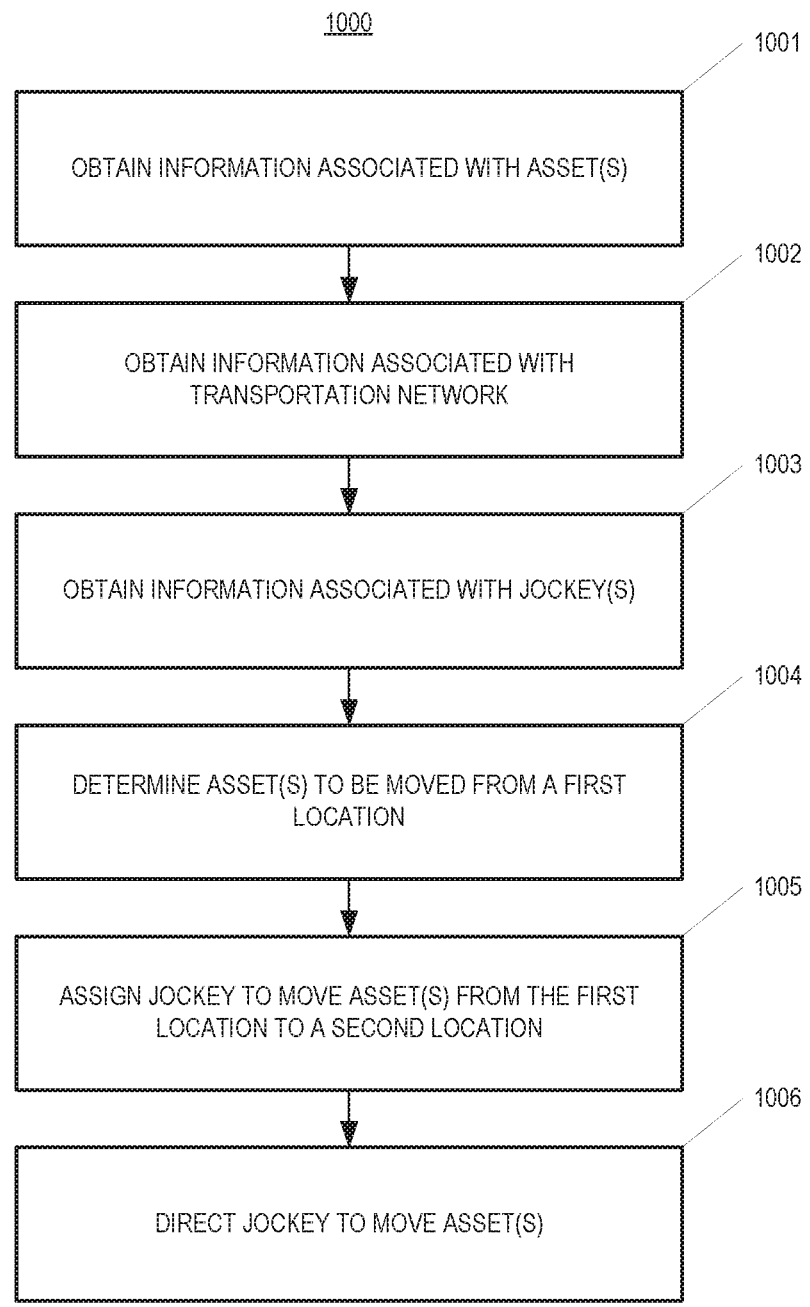
FIG. 10 depicts an example flow diagram for coordinating a transfer of assets according to example embodiments of the present disclosure.

FIGS. 8, 9 and 10 depict flow diagrams of example methods 800, 900 and 1000 for providing a vehicle-based service according to example embodiments of the present disclosure. One or more portion(s) of the methods 800, 900 and 1000 can be implemented as operations by one or more computing system(s) such as, for example, one or more computing systems of the service provider network 118 (e.g., the operations computing system 120, the transportation network computing system 122, and/or the jockey management computing system 124) and/or any other suitable systems, such as computing device(s)/system(s) 102, 126, 1101, and 1110 shown in FIGS. 1, 2, 3, and 11. For example, FIGS. 8, 9, and 10 illustrate certain operations being performed by specific computing systems described herein. However, it should be appreciated that such operations may generally be performed by any suitable computing system or combination of computing systems consistent with the disclosure provided herein. Moreover, one or more portion(s) of the methods 800, 900 and 1000 can be implemented as an algorithm on the hardware components of the system(s) described herein (e.g., as in FIGS. 1, 2, 3, and 11), for example, to transfer one or more assets (e.g., autonomous vehicle(s) and/or cargo) within a transfer. FIGS. 8, 9 and 10 depict elements performed in a particular order for purposes of illustration and discussion. Those of ordinary skill in the art, using the disclosures provided herein, will understand that the elements of any of the methods (e.g., of FIGS. 8, 9 and 10) discussed herein can be adapted, rearranged, expanded, omitted, combined, and/or modified in various ways without deviating from the scope of the present disclosure.

FIG. 8 depicts an example flow diagram for providing a vehicle-based service according to example embodiments of the present disclosure. At (801), the client computing system 126 can send data indicative of a service request to the operations computing system 120.

At (802), the operations computing system 120 can receive data indicative of the service request from the client computing system 126 for transporting cargo from a first location (e.g., pick-up location) to a second location (e.g., drop-off location). The data indicative of the service request can include the first location, the second location, and information associated with the cargo, and the operations computing system 120 can stored the data in the service request data 212 and cargo data 214.

At (803), the transportation network computing system 122 can send transfer hub data 220 and transportation route data 222 to the operations computing system 120.

At (804), the operations computing system 120 can receive the transfer hub data 220 and transportation route data 222 from the transportation network computing system 122.

At (805), the operations computing system 120 can determine a cargo route for the cargo based on the service request data 212, transfer hub data 220, and transportation route data 222. The operations computing system 120 can determine one or more transportation routes to transport the cargo from the first location to the second location via a plurality of transfer hubs. The operations computing system 120 can also determine a scheduled arrival time and a scheduled departure time for the cargo at each of the transfer hubs. The operations computing system 120 can store the cargo route in cargo route data 216.

At (806), the operations computing system 120 can send data indicative of the cargo route to the client computing system 126. In particular, the operations computing system 120 can send data indicative of a first transfer hub proximate to the first location and a second transfer hub proximate to the second location. The operations computing system 120 can also send data indicative of the scheduled arrival time for the cargo at the first transfer hub and at the second transfer hub.

At (807), the client computing system 126 can receive data indicative of the cargo route. A client associated with the client computing system 126 can transport the cargo from the first location to the first transfer hub at the scheduled arrival time (or before the scheduled arrival time) for the cargo at the first transfer hub, and transport the cargo from the second transfer hub to the second location at the scheduled arrival time (or after the scheduled arrival time) for the cargo at the second transfer hub.

At (808), the operations computing system 120 can select the vehicle 104 to transport the cargo, and can send data associated with the cargo in cargo data 214 and cargo route data 216 to the vehicle computing system 102.

At (809), the vehicle computing system 102 can receive data associated with the cargo, store the data in cargo data 376 and cargo route data 378, and control the vehicle 104 to autonomously transport the cargo from the first transfer hub to the second transfer hub.

FIG. 9 depicts an example flow diagram of transferring asset(s) within a transfer hub according to example embodiments of the present disclosure. At (901), the transportation network computing system 122 can send transfer hub data 220, transportation route data 222, and transfer schedule data 224 to the operations computing system 120.

At (902), the operations computing system 120 can receive the transfer hub data 220, transportation route data 222, and transfer schedule data 224 from the transportation network computing system 122. The operations computing system 120 can determine a first location associated with a transfer hub based on the transfer hub data 220.

At (903), one or more of the vehicles 104, 105 can send vehicle route data 372 (e.g., via a respective vehicle computing system) to the operations computing system 120.

At (904), the vehicle(s) 104, 105 can send cargo data 376 (e.g., via a respective vehicle computing system) to the operations computing system 120.

At (905), the operations computing system 120 can receive the vehicle route data 372 from the vehicle(s) 104, 105. The operations computing system 120 can determine whether the vehicle(s) 104, 105 have arrived at the first location or will arrive at the first location, based on the vehicle route data 372.

At (906), the operations computing system 120 can receive cargo data 376 from the vehicle(s) 104, 105. The operations computing system 120 can determine one or more attributes associated with cargo being transported by the vehicle(s) 104, 105 based on the cargo data 376.

At (905), the jockey management computing system 124 can send jockey data 274 to the operations computing system 120.

At (906), the operations computing system 120 can receive jockey data 274 from the jockey management computing system 124. The operations computing system 120 can determine one or more jockeys associated with the transfer hub based on the jockey data 274.

At (909), the operations computing system 120 can determine a new assignment to move one or more assets from the first location associated with the transfer hub. The operations computing system 120 can determine the asset(s) based on the attribute(s) associated with cargo being transported by the vehicle(s) 104, 105.

At (910), the operations computing system 120 can assign a jockey to move the asset(s) from the first location to a second location associated with the transfer hub at a future time. The operations computing system 120 can determine an availability of the jockey to move the asset(s) from the first location to the second location at the future time based on the jockey data 274.

The operations computing system 120 can send data indicative of an assignment request to the jockey management computing system 124. The operations computing system 120 can receive data indicative of an assignment confirmation from the jockey management computing system 124 and schedule the assignment for the jockey. Alternatively, the operations computing system 120 can send data indicative of the assignment request to a computing device associated with the jockey (e.g., mobile phone, personal computer, etc.), and receive the data indicative of the assignment conformation from the computing system associated with the jockey.

At (911), the jockey management computing system 124 can receive data indicative of an assignment request from the operations computing system 120. The jockey management computing system 124 can relay the assignment request to a computing device associated with the jockey (e.g., mobile phone, personal computer, etc.), or the jockey can access the jockey management computing system 124 to view and/or respond to the assignment request.

At (912), the jockey management computing system 124 can receive an assignment confirmation from the jockey, and send data indicative of the assignment confirmation to the operations computing system 120.

At (913), the operations computing system 120 can direct the jockey to move the asset(s) at the future time.

FIG. 10 depicts an example flow diagram of a method 1000 for coordinating a transfer of asset(s) according to example embodiments of the present disclosure. At (1001), the method 1000 can include obtaining information associated with one or more assets. For example, the operations computing system 120 can obtain vehicle route data 372 and cargo data 376 from the vehicle 104 (e.g., the vehicle computing system 102 onboard the vehicle 104) and/or from one or more of the vehicle(s) 105. The operations computing system 120 can determine cargo being transported by one or more of the vehicle(s) 104, 105 based on the cargo data 376, or based on a unique identifier associated with the vehicle(s) 104, 105 in the fleet data 210 and cargo information in the cargo data 214.

The operations computing system 120 can determine a current location associated with one or more assets (e.g., the vehicle(s) 104, 105 and/or cargo being transported by the vehicle(s) 104, 105) based on a vehicle location stored in the vehicle route data 273. For example, the operations computing system 120 can obtain data indicative of the current location associated with the asset(s) by obtaining the vehicle route data 273. The operations computing system 120 can determine that the current location associated with the asset(s) is the same as the vehicle location stored in the vehicle route data 273. If the current location of the asset(s) is the same as a current destination of the asset(s), then the operations computing system 120 can determine that the asset(s) are located at the current destination (e.g., transfer hub 500). If the current location of the asset(s) is not the same as the current destination of the asset(s), then the operations computing system 120 can determine that the asset(s) will arrive at the current destination at a future time. The operations computing system 120 can determine the future arrival time based on a distance between the current location and the current destination of the asset(s), or based on an estimated arrival time of the asset(s) stored in the vehicle route data 273.

At (1002), the method 1000 can include obtaining information associated with a transportation network. For example, the operations computing system 120 can obtain data indicative of a transportation network from the transportation network computing system 122. The data indicative of the transportation network can include the transfer hub data 220 and the transportation route data 222.

At (1003), the method 1000 can include obtaining information associated with one or more jockeys. For example, the operations computing system 120 can obtain jockey data 274 from the jockey management computing system 124.

At (1004), the method 1000 can include determining one or more assets to move from a first location associated with a transfer hub. For example, the operations computing system 120 can determine one or more first assets (e.g., the vehicle(s) 104, 105 and/or cargo being transported by the vehicle(s) 104, 105) that are located at a first location (e.g., landing zone 510) associated with a transfer hub (e.g., transfer hub 500) at a current time and/or determine one or more second assets (e.g., the vehicle(s) 104, 105 and/or cargo being transported by the vehicle(s) 104, 105) that will arrive at the first location at a future time, based on the vehicle route data 273 and the transfer hub data 220. The operations computing system 120 can group one or more of the first asset(s) together, and group one or more of the second asset(s) with the first asset(s) to determine one or more asset(s) to move from the first location.

The operations computing system 120 can determine the asset(s) to move from the first location in response to one or more triggering events. The triggering event(s) can include, for example, a determination that the asset(s) are located at the first location, a determination that the asset(s) will arrive at the first location at a future time, a capacity threshold associated with the first location being met or exceeded, a predetermined time interval, etc.

The operations computing system 120 can determine the asset(s) to move from the first location based on one or more attributes associated with the asset(s) in the cargo data 214, 376 and one or more attributes associated with the first location in the transfer hub data 220.

The one or more attributes associated with the asset(s) can include, for example, a cargo-type (e.g., a cargo-type associated with cargo being transported by the vehicle(s) 104, 105), a scheduled arrival time (e.g., a scheduled arrival time associated with cargo arriving at the first location), a scheduled departure time (e.g., a scheduled departure time from the first location associated with cargo arriving at the first location), an estimated arrival time (e.g., an estimated arrival time associated with the vehicle(s) 104, 105), and an operational status (e.g., an operational status associated with the vehicle(s) 104, 105).

The one or more attributes associated with the first location can include, for example, an available capacity (e.g., an available capacity associated with the landing zone 510), and a capacity threshold (e.g., a capacity threshold associated with the landing zone 510).

At (1005), the method 1000 can include assigning a jockey to move the asset(s) from the first location to a second location. For example, the operations computing system 120 can determine a pool of jockeys associated with the transfer hub based on the jockey data 274, determine one or more candidate locations (e.g., dropyards 530, 532, 534, 536, 538, 540, 542, 544 and/or launch zones 520, 522) associated with the transfer hub that can receive the asset(s) from the first location, based on the one or more attributes associated with the asset(s) and one or more attributes associated with each of the candidate location(s) in the transfer hub data 220.

The one or more attributes associated with each candidate location can include, for example, an available capacity, geographic coordinates, characteristics or facilities specifically tailored for holding a particular cargo-type (e.g., hazardous, climate-controlled, etc.), and characteristics or facilities specifically tailored for performing a maintenance/repair service.

The operations computing system 120 can determine an assignment to move the asset(s) located at and/or arriving at the first location, from the first location to a second location (e.g., dropyard 530) within the transfer hub at a first time (e.g., at a time after all of the asset(s) have arrived at the first location) based on an availability of a jockey from the pool of jockeys.

The operations computing system 120 can determine the availability of the jockey for the assignment based on one or more attributes associated with the jockey in the jockey data 274. The one or more attributes can include, for example, a jockey identifier, transfer hub, an assignment log, a location, a travel distance, a travel mode, a travel time, shift information, one or more licenses, a performance rating, and an assignment confirmation.

The operations computing system 120 can assign the assignment to an available jockey from the pool of jockeys who is available for the assignment at the first time, and schedule the assignment at the first time.

At (1006), the method 1000 can include directing the jockey to move the asset(s). For example, the operations computing system 120 can direct the jockey to move the asset(s) at the first time. The operations computing system 120 can communicate with a computing system associated with the jockey (e.g., mobile phone, personal computer, etc.), either directly or via the jockey management computing system 124, to send a command directing the jockey to move the asset(s). The operations computing system 120 can send the command at the first time and/or one or more times proximate to the first time.

Figure 11:
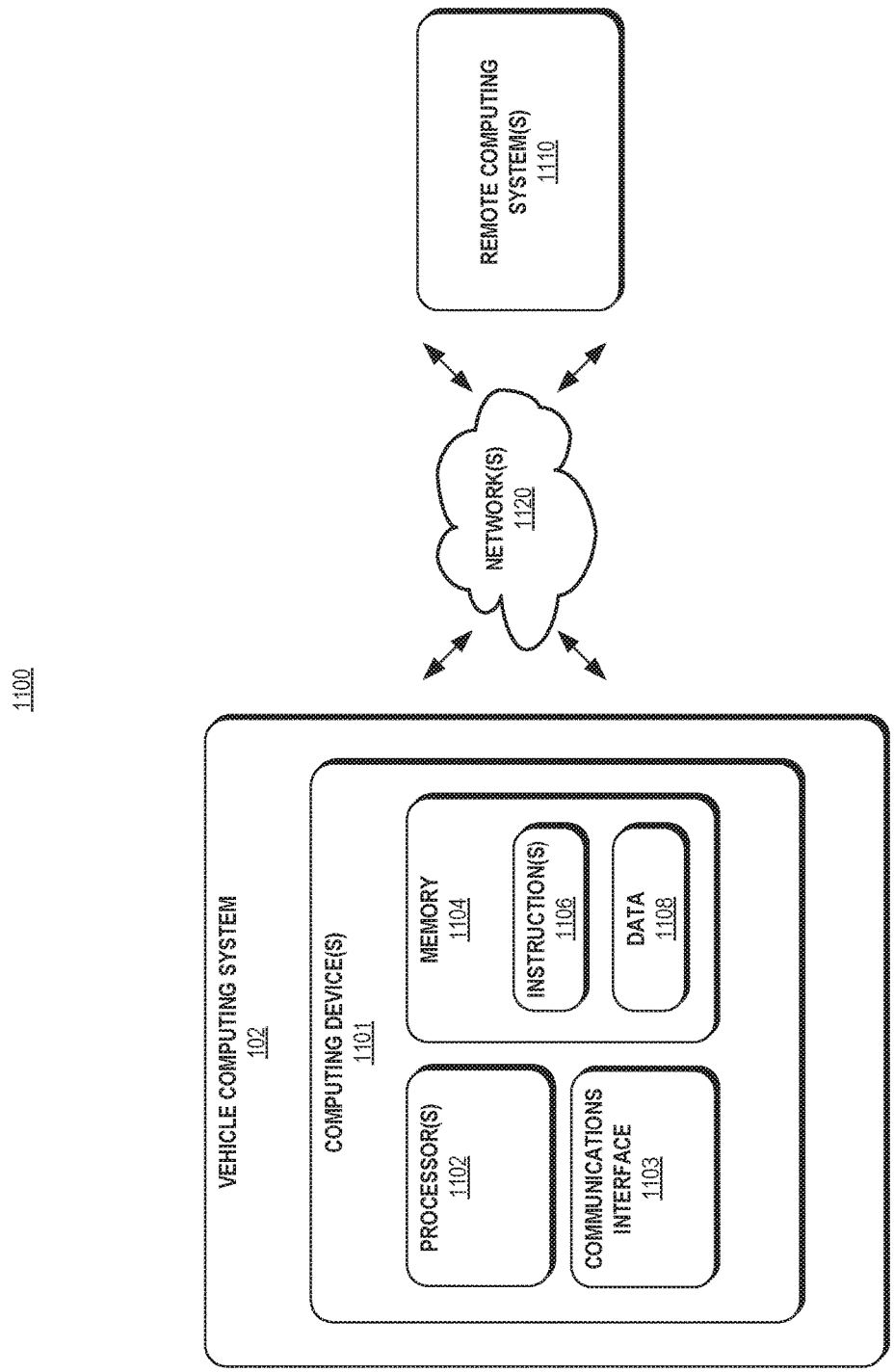
FIG. 11 depicts example system components according to example embodiments of the present disclosure.

FIG. 11 depicts an example computing system 1100 according to example embodiments of the present disclosure. The example system 1100 illustrated in FIG. 11 is provided as an example only. The components, systems, connections, and/or other aspects illustrated in FIG. 11 are optional and are provided as examples of what is possible, but not required, to implement the present disclosure. The example system 1100 can include the vehicle computing system 102 of the vehicle 104 and, in some implementations, remote computing system(s) 1110 including one or more remote computing system(s) that are remote from the vehicle 104 (e.g., one or more computing systems of the service provider network 118) that can be communicatively coupled to one another over one or more networks 1120. The remote computing system 1110 can be associated with a central operations system and/or an entity associated with the vehicle 104 such as, for example, a vehicle owner, vehicle manager, fleet operator, service provider network, etc.

The computing device(s) 1101 of the vehicle computing system 102 can include processor(s) 1102 and a memory 1104. The one or more processors 1102 can be any suitable processing device (e.g., a processor core, a microprocessor, an ASIC, a FPGA, a controller, a microcontroller, etc.) and can be one processor or a plurality of processors that are operatively connected. The memory 1104 can include one or more non-transitory computer-readable storage media, such as RAM, ROM, EEPROM, EPROM, one or more memory devices, flash memory devices, etc., and combinations thereof.

The memory 1104 can store information that can be accessed by the one or more processors 1102. For instance, the memory 1104 (e.g., one or more non-transitory computer-readable storage mediums, memory devices) on-board the vehicle 104 can include computer-readable instructions 1106 that can be executed by the one or more processors 1102. The instructions 1106 can be software written in any suitable programming language or can be implemented in hardware. Additionally, or alternatively, the instructions 1106 can be executed in logically and/or virtually separate threads on processor(s) 1102.

For example, the memory 1104 on-board the vehicle 104 can store instructions 1106 that when executed by the one or more processors 1102 on-board the vehicle 104 cause the one or more processors 1102 (the vehicle computing system 102) to perform operations such as any of the operations and functions of the vehicle computing system 102, as described herein, one or more operations of methods 800 and 900, and/or any other operations and functions of the vehicle computing system 102, as described herein.

The memory 1104 can store data 1108 that can be obtained, received, accessed, written, manipulated, created, and/or stored. The data 1108 can include, for instance, data associated with perception, prediction, motion plan, maps, vehicle diagnostics, vehicle route, vehicle convoy, cargo, cargo route, vehicle fleet, service request, transfer hub, transportation route, jockey, and/or other data/information as described herein. In some implementations, the computing device(s) 1101 can obtain data from one or more memory device(s) that are remote from the vehicle 104.

The computing device(s) 1101 can also include a communication interface 1103 used to communicate with one or more other system(s) on-board the vehicle 104 and/or a remote computing device that is remote from the vehicle 104 (e.g., of remote computing system(s) 1110). The communication interface 1103 can include any circuits, components, software, etc. for communicating via one or more networks (e.g., 1120). In some implementations, the communication interface 1103 can include, for example, one or more of a communications controller, receiver, transceiver, transmitter, port, conductors, software, and/or hardware for communicating data.

The network(s) 1120 can be any type of network or combination of networks that allows for communication between devices. In some embodiments, the network(s) can include one or more of a local area network, wide area network, the Internet, secure network, cellular network, mesh network, peer-to-peer communication link, and/or some combination thereof, and can include any number of wired or wireless links. Communication over the network(s) 1120 can be accomplished, for instance, via a communication interface using any type of protocol, protection scheme, encoding, format, packaging, etc.

The remote computing system 1110 can include one or more remote computing devices that are remote from the vehicle computing system 102. The remote computing devices can include components (e.g., processor(s), memory, instructions, data) similar to that described herein for the computing device(s) 1101. Moreover, the remote computing system(s) 1110 can be configured to perform one or more operations of the service provider network 118, as described herein. Moreover, the computing systems of other vehicles described herein can include components similar to that of vehicle computing system 112.

Computing tasks discussed herein as being performed at computing device(s) remote from the vehicle can instead be performed at the vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for coordinating movement of autonomous vehicles at transfer hubs, the method comprising:

determining a plurality of autonomous vehicles to move from a first location associated with a transfer hub;

grouping the plurality of autonomous vehicles into a first group to move the plurality of autonomous vehicles in the first group together from the first location;

assigning a vehicle operator to move the first group from the first location to a second location associated with the transfer hub based at least in part on an availability of the vehicle operator; and directing the vehicle operator to move a support vehicle from the first location to the second location, wherein at least one of the plurality of autonomous vehicles in the first group are configured to autonomously follow the support vehicle from the first location to the second location.

2. The computer-implemented method of claim 1, wherein grouping the plurality of autonomous vehicles into a first group to move the plurality of autonomous vehicles in the first group together from the first location comprises:
   determining that the plurality of autonomous vehicles are located at the first location at a current time.

3. The computer-implemented method of claim 2, further comprising:
   determining one or more second autonomous vehicles that will arrive at the first location at a future time; and
   grouping the one or more second autonomous vehicles into the first group to move the one or more autonomous vehicles and the one or more second autonomous vehicles in the first group together from the first location.

4. The computer-implemented method of claim 1, comprising:
   directing the vehicle operator to move the support vehicle from the first location to the second location by manually operating the support vehicle.

5. The computer-implemented method of claim 4, wherein the support vehicle is an autonomous vehicle in a manual mode.

6. The computer-implemented method of claim 4, wherein the support vehicle is a non-autonomous vehicle.

7. The computer-implemented method of claim 1, comprising:
   directing the vehicle operator to move the support vehicle from the first location to the second location by remotely operating the support vehicle.

8. The computer-implemented method of claim 7, wherein the support vehicle is an autonomous vehicle in autonomous mode.

9. The computer-implemented method of claim 1, wherein assigning the vehicle operator to move the first group to the second location associated with the transfer hub based at least in part on the availability of the vehicle operator comprises:
   sending an assignment request to the vehicle operator, the assignment request associated with an assignment to move the plurality of autonomous vehicles from the first location to the second location; and
   receiving a confirmation from the vehicle operator, the confirmation indicating acceptance of the assignment request by the vehicle operator.

10. The computer-implemented method of claim 1, further comprising:
    detecting a triggering event including at least one of
       a determination that the plurality of autonomous vehicles are located at the first location,
       a determination that the plurality of autonomous vehicles will arrive at the first location at a future time,
       a determination that a capacity threshold associated with the first location has been met or exceeded,
       a determination that the capacity threshold associated with the first location will be met at a future time,
       a determination that one or more additional autonomous vehicles will arrive at the first location at a future time, or
       a determination that a predetermined time interval has elapsed; and
    determining the plurality of autonomous vehicles to move from the first location associated with the transfer hub in response to the triggering event.

11. The computer-implemented method of claim 1, comprising:
    directing the vehicle operator to move the support vehicle from the first location to the second location by riding in the support vehicle, wherein the support vehicle is an autonomous vehicle in autonomous mode.

12. A computer-implemented method for coordinating movement of autonomous vehicles at transfer hubs, the method comprising:
    determining one or more autonomous vehicles to move from a first location associated with a transfer hub;
    grouping the one or more autonomous vehicles into a first group to move the one or more autonomous vehicles in the first group together from the first location;
    assigning a vehicle operator to move the first group from the first location to a second location associated with the transfer hub based at least in part on an availability of the vehicle operator; and
    directing the vehicle operator to move a support vehicle from the first location to the second location, wherein at least one of the one or more autonomous vehicles in the first group are configured to autonomously follow the support vehicle from the first location to the second location;
    wherein assigning the vehicle operator to move the first group to the second location associated with the transfer hub based at least in part on the availability of the vehicle operator comprises:
       selecting the second location from a plurality of candidate locations associated with the transfer hub to receive the first group from the first location;
       determining that the vehicle operator is available to move the first group from the first location to the second location; and
       assigning the vehicle operator to move the first group from the first location to the second location.

13. The computer-implemented method of claim 12, wherein assigning the vehicle operator to move the first group to the second location associated with the transfer hub based at least in part on the availability of the vehicle operator comprises:
    determining one or more attributes associated with the one or more autonomous vehicles;
    determining one or more attributes associated with one or more locations associated with the transfer hub;
    determining the one or more candidate locations from the one or more locations associated with the transfer hub based at least in part on the one or more attributes associated with the one or more autonomous vehicles and the one or more attributes associated with the one or more locations; and
    assigning the vehicle operator to move the first group from the first location to one of the candidate locations.

14. The computer-implemented method of claim 13, wherein:
    the one or more attributes associated with the one or more autonomous vehicles comprise at least one of a cargo-type, a scheduled arrival time at the transfer hub, an estimated arrival time at the transfer hub, a scheduled departure time from the transfer hub, or operational status; and
    the one or more attributes associated with the one or more locations comprise at least one of an available capacity for receiving the one or more autonomous vehicles, geographic coordinates, characteristics or facilities associated with holding a cargo-type associated with the one or more autonomous vehicles, or characteristics or facilities associated with performing a maintenance/repair service associated with the one or more autonomous vehicles.

15. The computer-implemented method of claim 12, wherein determining that the vehicle operator is available to move the first group from the first location to the second location of the one or more candidate locations comprises:
determining one or more attributes associated with the one or more autonomous vehicles;
determining a pool of vehicle operators associated with the transfer hub;
determining one or more attributes associated with one or more vehicle operators from the pool of vehicle operators; and
determining the vehicle operator from the one or more vehicle operators based at least in part on the one or more attributes associated with the vehicle operator and the one or more attributes associated with the one or more autonomous vehicles.

16. The computer-implemented method of claim 15, wherein:
the one or more attributes associated with the one or more autonomous vehicles comprise at least one of a cargo-type, a scheduled arrival time at the transfer hub, an estimated arrival time at the transfer hub, a scheduled departure time from the transfer hub, or operational status; and
the one or more attributes associated with the vehicle operator comprise at least one of a vehicle operator identifier, the transfer hub in which the vehicle operator is working, an assignment log including pending assignments for the vehicle operator, a vehicle operator location within the transfer hub, a travel distance for the vehicle operator to travel to the first location, a travel mode by which the vehicle operator travels to the first location, a travel time for the vehicle operator to travel to the first location, shift information indicating working hours of the vehicle operator, one or more licenses acquired by the vehicle operator, a performance rating, and an assignment confirmation provided by the vehicle operator.

17. A computing system for coordinating a movement of autonomous vehicles at transfer hubs, the system comprising:
one or more processors; and
one or more tangible, non-transitory, computer readable media that store instructions that when executed by the one or more processors cause the computing system to perform operations, the operations comprising:
determining a plurality of autonomous vehicles to move from a first location associated with a transfer hub;
grouping the plurality of autonomous vehicles into a first group to move the plurality of autonomous vehicles in the first group together from the first location;
assigning a vehicle operator to move the first group from the first location to a second location associated with the transfer hub based at least in part on an availability of the vehicle operator; and
directing the vehicle operator to move a support vehicle from the first location to the second location, wherein at least one of the plurality of autonomous vehicles in the first group are configured to autonomously follow the support vehicle from the first location to the second location.

18. The computing system of claim 17, wherein grouping the one or more autonomous vehicles into the first group to move the one or more autonomous vehicles in the first group together from the first location comprises:
obtaining data indicative of a current location of one or more first autonomous vehicles;
determining that the one or more autonomous vehicles are at the first location associated with the transfer hub at a current time based at least in part on the current location of the one or more autonomous vehicles.

19. The computing system of claim 18, wherein the operations further comprise:
obtaining data indicative of a current location of one or more second autonomous vehicles;
determining that the one or more second autonomous vehicles will arrive at the first location associated with the transfer hub at a future time based at least in part on the current location of the one or more second autonomous vehicles; and
grouping the one or more second autonomous vehicles into the first group with the one or more autonomous vehicles.

20. The computing system of claim 17, wherein assigning the vehicle operator to move the first group to the second location associated with the transfer hub based at least in part on the availability of the vehicle operator comprises:
sending an assignment request to a computing system associated with the vehicle operator, the assignment request including data indicative of the first location, the second location, and the plurality of autonomous vehicles to be moved from the first location to the second location; and
receiving an assignment confirmation by the vehicle operator from the computing system associated with the vehicle operator, the assignment confirmation corresponding to the assignment request.

21. The computing system of claim 17, wherein the operations comprise:
directing the vehicle operator to move the support vehicle from the first location to the second location by manually operating the support vehicle.

22. The computing system of claim 21, wherein the support vehicle is an autonomous vehicle in a manual mode.

23. The computing system of claim 21, wherein the support vehicle is a non- autonomous vehicle.

24. The computing system of claim 17, wherein the operations comprise:
directing the vehicle operator to move the support vehicle from the first location to the second location by remotely operating the support vehicle.

25. The computing system of claim 24, wherein the support vehicle is an autonomous vehicle in autonomous mode.

26. The computing system of claim 17, wherein the operations comprise:
directing the vehicle operator to move the support vehicle from the first location to the second location by riding in the support vehicle, wherein the support vehicle is an autonomous vehicle in autonomous mode.

27. A computing system for coordinating a movement of autonomous vehicles at transfer hubs, the system comprising:
one or more processors; and
one or more tangible, non-transitory, computer readable media that store instructions that when executed by the one or more processors cause the computing system to perform operations, the operations comprising:

determining one or more autonomous vehicles to move from a first location associated with a transfer hub;

grouping the one or more autonomous vehicles into a first group to move the one or more autonomous vehicles in the first group together from the first location;

assigning a vehicle operator to move the first group from the first location to a second location associated with the transfer hub based at least in part on an availability of the vehicle operator, wherein assigning the vehicle operator to move the first group to the second location associated with the transfer hub based at least in part on the availability of the vehicle operator comprises:

obtaining data indicative of one or more attributes associated with the one or more autonomous vehicles from at least one of a client computing system or the one or more autonomous vehicles, wherein the one or more autonomous vehicles are managed by the computing system;

obtaining data indicative of one or more attributes associated with one or more locations associated with the transfer hub from a transportation network computing system; and determining one or more candidate locations associated with the transfer hub to receive the one or more autonomous vehicles from the first location based at least in part on the one or more attributes associated with the one or more autonomous vehicles and the one or more attributes associated with one or more locations associated with the transfer hub; and directing the vehicle operator to move a support vehicle from the first location to the second location, wherein at least one of the one or more autonomous vehicles in the first group are configured to autonomously follow the support vehicle from the first location to the second location.

28. The computing system of claim 27, wherein the operations further comprise:

obtaining data indicative of one or more vehicle operators associated with the transfer hub and data indicative of one or more attributes associated with the one or more vehicle operators from a vehicle operator management computing system; and determining that the vehicle operator is available to move the first group from the first location to a selected location in the one or more candidate locations at a future time based at least in part on the one or more attributes associated with the one or more vehicle operators.

29. The computing system of claim 28, wherein the operations further comprise:

determining the second location associated with the transfer hub as the selected location in the one or more candidate locations; and scheduling an assignment for the vehicle operator to move the first group from the first location to the second location at the future time.

30. The computing system of claim 28, wherein the one or more attributes associated with the one or more vehicle operators comprise at least one of a vehicle operator identifier, the transfer hub in which the vehicle operator is working, an assignment log including pending assignments for the vehicle operator, a vehicle operator location within the transfer hub, a travel distance for the vehicle operator to travel to the first location, a travel mode by which the vehicle operator travels to the first location, a travel time for the vehicle operator to travel to the first location, shift information indicating working hours of the vehicle operator, one or more licenses acquired by the vehicle operator, a performance rating, and an assignment confirmation provided by the vehicle operator.

31. The computing system of claim 27, wherein the one or more attributes associated with the one or more autonomous vehicles comprise at least one of a cargo-type, a scheduled arrival time at the transfer hub, an estimated arrival time at the transfer hub, a scheduled departure time from the transfer hub, or operational status.

32. The computing system of claim 27, wherein the one or more attributes associated with one or more locations associated with the transfer hub comprise at least one of an available capacity for receiving the one or more autonomous vehicles, geographic coordinates, characteristics or facilities associated with holding a cargo-type associated with the one or more autonomous vehicles, or characteristics or facilities associated with performing a maintenance service associated with the one or more autonomous vehicles.

* * * * *